US011897089B2

(12) United States Patent
Schiveley et al.

(10) Patent No.: US 11,897,089 B2
(45) **Date of Patent: *Feb. 13, 2024**

(54) CABINET ASSEMBLY JIG

(71) Applicant: American Woodmark Management Company, Anaheim, CA (US)

(72) Inventors: John Schiveley, Fort Mojave, AZ (US); Robert C. Myer, Jr., Chino, CA (US); Simon Barrios, Valinda, CA (US); Eric Ramirez, Pomona, CA (US)

(73) Assignee: American Woodmark Management Company, Winchester, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,559

(22) Filed: Oct. 3, 2022

(65) Prior Publication Data

US 2023/0128995 A1 Apr. 27, 2023

Related U.S. Application Data

(60) Continuation of application No. 17/384,524, filed on Jul. 23, 2021, now Pat. No. 11,478,904, which is a (Continued)

(51) Int. Cl.
*B25B 11/02* (2006.01)
*B27M 3/18* (2006.01)
(Continued)

(52) U.S. Cl.
CPC ............... *B25B 11/02* (2013.01); *B25B 5/006* (2013.01); *B27M 3/18* (2013.01); *B27M 3/34* (2013.01)

(58) Field of Classification Search
CPC ......... B23P 19/04; B23P 19/10; B23P 21/002; B25B 5/006; B25B 11/02; B27M 3/18;
(Continued)

(56) References Cited

U.S. PATENT DOCUMENTS

| | | |
|---|---|---|
| 3,665,986 A | 5/1972 | Johnson |
| 4,485,539 A | 12/1984 | Blaine |

(Continued)

FOREIGN PATENT DOCUMENTS

| | | | |
|---|---|---|---|
| DE | 2453808 A1 | | 7/1975 |
| DE | 2553814 | * | 6/1976 |

(Continued)

*Primary Examiner* — Matthew P Travers
(74) *Attorney, Agent, or Firm* — Knobbe, Martens, Olson & Bear, LLP

(57) ABSTRACT

A jig for assembling a cabinet is disclosed. The jig includes a clamp assembly pivotally attached to a base. The clamp assembly includes a first jaw and a second jaw configured to apply a clamping force therebetween. The clamp assembly can pivot between a first position and a first inclined position. In the first position, a front support plate of the clamp assembly is oriented vertically, and in the first inclined position, a first angle less than 90 degrees is formed between the front support plate and a support surface on which the base rests. The clamp assembly may also pivot to a second inclined position at which a second angle less than the first angle is formed between the front support plate and the support surface.

14 Claims, 23 Drawing Sheets

Related U.S. Application Data continuation of application No. 16/839,679, filed on Apr. 3, 2020, now Pat. No. 11,103,978, which is a division of application No. 15/446,957, filed on Mar. 1, 2017, now Pat. No. 10,646,979.

(60) Provisional application No. 62/302,682, filed on Mar. 2, 2016.

(51) Int. Cl.
*B25B 5/00* (2006.01)
*B27M 3/34* (2006.01)

(58) Field of Classification Search
CPC ................ B27M 3/34; Y10T 29/49829; Y10T 29/49892; Y10T 29/49895; Y10T 29/49902; Y10T 29/49998; Y10T 29/53539–53548; Y10T 29/53961; Y10T 29/53974; Y10T 29/53978
See application file for complete search history.

(56) References Cited

U.S. PATENT DOCUMENTS

| | | | | |
|---|---|---|---|---|
| 4,819,922 | A | 4/1989 | Boike | |
| 5,107,577 | A | 4/1992 | Jackson et al. | |
| 5,722,646 | A | 3/1998 | Soderberg et al. | |
| 7,661,181 | B1 | 2/2010 | Whitfield | |
| 10,646,979 | B1 | 5/2020 | Schiveley et al. | |
| 11,103,978 | B2 * | 8/2021 | Schiveley | B25B 11/02 |
| 11,478,904 | B2 * | 10/2022 | Schiveley | B25B 11/02 |
| 2007/0262505 | A1 | 11/2007 | Tonnigs | |
| 2014/0026389 | A1 | 1/2014 | Green et al. | |

FOREIGN PATENT DOCUMENTS

| | | | |
|---|---|---|---|
| DE | 2553814 | A1 | 6/1976 |
| DE | 3916013 | A1 | 11/1989 |
| EP | 1046481 | A1 | 10/2000 |
| EP | 1046482 | A1 | 10/2000 |
| EP | 1329296 | A2 | 7/2003 |
| SU | 447264 | A1 | 10/1974 |
| SU | 504650 | A1 | 2/1976 |
| SU | 1311935 | A1 | 5/1987 |

* cited by examiner

CABINET ASSEMBLY JIG

INCORPORATION BY REFERENCE TO ANY PRIORITY APPLICATIONS

This application is a continuation of U.S. patent application Ser. No. 17/384,524, filed Jul. 23, 2021, which is a continuation of U.S. patent application Ser. No. 16/839,679, filed Apr. 3, 2020, which is a division of U.S. patent application Ser. No. 15/446,957, filed Mar. 1, 2017, which claims priority to U.S. Provisional Patent Application No. 62/302,682, filed Mar. 2, 2016, each of which is incorporated herein by reference in its entirety. Any and all applications for which a foreign or domestic priority claim is identified in the Application Data Sheet as filed with the present application are hereby incorporated by reference under 37 C.F.R. § 1.57.

BACKGROUND

Field

This disclosure relates to a jig for assembling furniture. More specifically, this disclosure relates to a jig that, in some embodiments, can be used by a single worker to assemble a cabinet.

Description

Cabinets, or other types of furniture, can be constructed from one or more individual panels attached together. For example, a cabinet can include a front panel, two side panels, a back panel, and a bottom panel, among others. Assembling these panels into a cabinet often requires positioning the panels relative to each other and then attaching the panels to each other, using adhesive and/or mechanical fasteners. It can be difficult for a single worker to both position the panels relative to each other and attach the panels.

SUMMARY

The embodiments of jigs and methods of use disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods.

In one aspect, a jig for assembling a cabinet is disclosed. The jig includes a clamp assembly pivotally attached to a base. The clamp assembly includes a first holder, such as a gripper, which may be a first jaw, and a second holder, such as a gripper, such as a second jaw, configured to apply a clamping force therebetween. The clamp assembly is configured to move, such as by pivoting, between a first position, wherein a front support plate of the clamp assembly is oriented vertically, and a first inclined position which is at a first angle with respect to said first position. Desirably, the first angle is less than 90 degrees is formed between the front support plate and a support surface on which the base rests.

In some embodiments, the first angle is between 15 and 60 degrees, between 15 and 45 degrees, between 25 and 35 degrees, at least 10 degrees, at least 15 degrees, at least 20 degrees, at least 30 degrees, at least 40 degrees, at least 45 degrees, 15 degrees, 30 degrees, or 45 degrees. In some embodiments, the clamp assembly is further configured to pivot to a second inclined (or more reclined) position, wherein a second angle less than the first angle is formed between the front support plate and the support surface. In some embodiments, the second angle is between 15 and 60 degrees less than the first angle, between 15 and 45 degrees less than the first angle, between 25 and 35 degrees less than the first angle, at least 15 degrees less than the first angle, at least 20 degrees less than the first angle, at least 30 degrees less than the first angle, at least 40 degrees less than the first angle, at least 45 degrees less than the first angle, 15 degrees less than the first angle, 30 degrees less than the first angle, or 45 degrees less than the first angle. In some embodiments, in the second inclined position, a bottom of the clamp assembly is raised by a vertical distance of at least ¾, of at least ½, of at least ¼, or of at least ⅛ a total height of the clamp assembly relative to the first inclined position.

In some embodiments, the jig further comprises a linear actuator extending between the base and the clamp assembly. In some embodiments, actuation of the linear actuator causes the clamp assembly to move, such as by pivoting between the first position and the first inclined position. In some embodiments, the clamp assembly further includes a first side support surface, such as a plate, attached to the first jaw, the first side support plate extending normal to the front support plate, and a second side support surface, such as a second plate attached to the second jaw, wherein the second jaw is movable between a closed position, wherein the second side support plate extends normal to the front support plate, and an open position. In some embodiments, in the open position of the second jaw, the second side support plate extends parallel to the front support plate. In some embodiments, the jig further comprises a conveyor system mounted on the base. In some embodiments, the conveyor system is configured to move between an extended position and a retracted position. In some embodiments, when the clamp assembly is in the first position and the conveyor system is in the extended position, the conveyor system is positioned below the clamp assembly. In some embodiments, when the clamp assembly is in the first position and the conveyor system is in the extended position, the jig is configured to deposit an assembled cabinet onto the conveyor system by moving the second jaw to the open position. In some embodiments, the jig is operable by a single worker to assemble a cabinet.

In some embodiments, the clamping assembly further comprises a pair of rods configured to move between an extended state, wherein the pair of rods extends through the front support plate, and a retracted state. In some embodiments, each of the first jaw and the second jaw include a pair of rods configured to move between an extended state, wherein the pair of rods extends through the first and second side support plates, respectively, and a retracted state. In some embodiments, each of the first jaw and the second jaw include an end clamp positioned at the distal end of the first jaw and the second jaw, the end clamp configured to rotate between an open position and a closed position, wherein, in the closed position, the end clamp provides a clamping force in a direction parallel to the first and second side support plates. In some embodiments, each of the first jaw and the second jaw include a toe kick panel support assembly positioned at a lower proximal corner of the first and second side support surfaces, respectively, each toe kick panel support assembly including a toe kick support surface configured to rotate between an extended configuration, wherein the toe kick support surface is normal to the first and second side support plates, and a retracted position.

In another aspect a jig for assembling a cabinet is disclosed. The jig includes a base and a clamp assembly pivotally attached to the base. The clamp assembly includes a first jaw and a second jaw configured to apply a clamping force therebetween. The jig also includes a conveyor system mounted on the base. The conveyor system is configured to move between an extended position and a retracted position.

In some embodiments, the clamp assembly further includes a front support plate, a first side support plate attached to the first jaw, the first side support plate extending normal to the front support plate, and a second side support plate attached to the second jaw, wherein the second jaw is movable between a closed position, wherein the second side support plate extends normal to the front support plate, and an open position. In some embodiments, in the open position of the second jaw, the second side support plate extends parallel to the front support plate. In some embodiments, the clamp assembly is configured to pivot between a first position, wherein the front support plate is oriented vertically, and a first inclined position, wherein a first angle less than 90 degrees is formed between the front support plate and a support surface on which the base rests. In some embodiments, the clamp assembly is further configured to pivot to a second inclined position, wherein a second angle less than the first angle is formed between the front support plate and the support surface. In some embodiments, when the clamp assembly is in the first position and the conveyor system is in the extended position, the conveyor system is positioned below the clamp assembly. In some embodiments, the clamping assembly further comprises a pair of rods configured to move between an extended state, wherein the pair of rods extends through the front support plate, and a retracted state. In some embodiments, each of the first jaw and the second jaw include a pair of rods configured to move between an extended state, wherein the pair of rods extends through the first and second side support plates, respectively, and a retracted state. In some embodiments, each of the first jaw and the second jaw include an end clamp positioned at the distal end of the first jaw and the second jaw, the end clamp configured to rotate between an open position and a closed position, wherein, in the closed position, the end clamp provides a clamping force in a direction parallel to the first and second side support plates. In some embodiments, each of the first jaw and the second jaw include a toe kick panel support assembly positioned at a lower proximal corner of the first and second side support surfaces, respectively, each toe kick panel support assembly including a toe kick support surface configured to rotate between an extended configuration, wherein the toe kick support surface is normal to the first and second side support plates, and a retracted position.

In another aspect, a method for assembling a cabinet using a jig is disclosed. The method includes: with a jig positioned in a first configuration, supporting a cabinet during a first portion of the assembly of the cabinet with the jig; transitioning the jig from the first configuration to a second configuration, wherein, in the second configuration, a clamp assembly of the jig is more reclined than in the first configuration; and with the jig positioned in the second configuration, supporting the cabinet during a second portion of the assembly of the cabinet with the jig.

In some embodiments, the method further includes transitioning the jig from the second configuration to a third configuration, wherein, in the third configuration, the cabinet is positioned over a conveyor system; and depositing the cabinet on the conveyor system. In some embodiments, supporting a cabinet during a first portion of the assembly comprises: supporting a front panel of the cabinet with front support surface of the jig; supporting a first side panel of the cabinet with a first side support surface of a first jaw of the jig; supporting a second side panel of the cabinet with a second side support surface of a second jaw of the jig; and supporting a bottom panel between the first side panel and the second side panel. In some embodiments, the method further includes, with the jig positioned in the first configuration, applying pressure to the first portion of the cabinet with the jig by moving the first jaw toward the second jaw. In some embodiments, transitioning the jig from the first configuration to a second configuration comprises retracting rods which extend through the first and second support surfaces, the rods configured to support the first and second panels of the cabinet when extended. In some embodiments, transitioning the jig from the first configuration to a second configuration comprises extending a toe kick support. In some embodiments, supporting the cabinet during a second portion of the assembly of the cabinet comprises installing a toe kick panel of the cabinet. In some embodiments, transitioning the jig from the second position to the third configuration comprises: rotating the clamp assembly from the more reclined position of the second configuration to a vertical position; extending the conveyor system below the clamp assembly; and opening the second jaw. In some embodiments, the method further includes driving the conveyor assembly to move the cabinet away from the jig.

In another aspect, an assembly, such as an assembly cell, is disclosed. The assembly may include two of the jigs described herein. In some embodiments, the assembly includes a system or assembly of conveyors to move assembled cabinets from the two jigs. In some embodiments, sensors control the conveyors.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are not to be considered limiting of its scope, the disclosure will be described with additional specificity and detail through use of the accompanying drawings. The drawings may not be to scale.

DETAILED DESCRIPTION

Figure 1A:
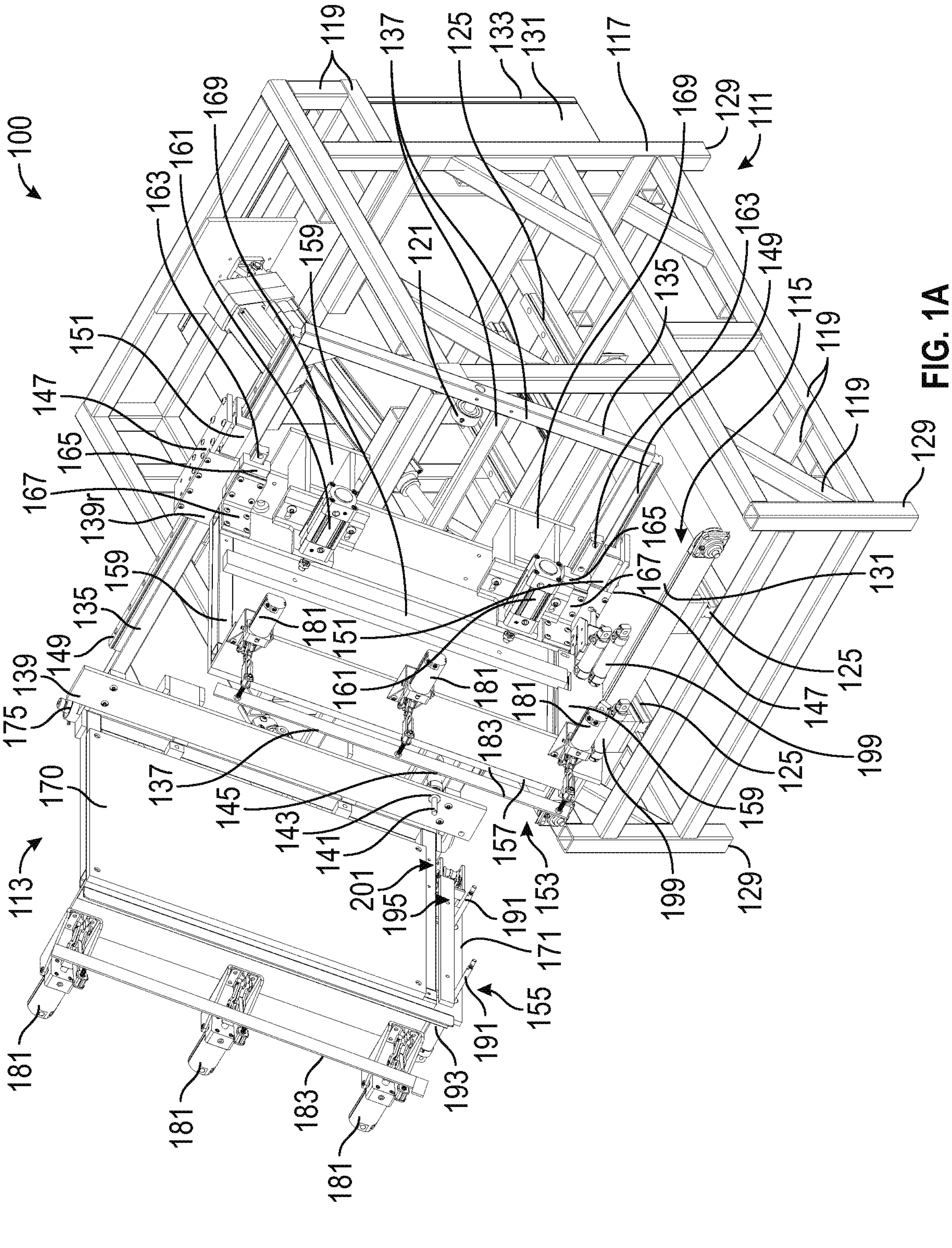
FIG. 1A is a first isometric view of an embodiment of a cabinet assembly jig in a first configuration.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

FIGS. 1A-3C illustrate an embodiment of a cabinet assembly jig 100 (referred to herein as the jig 100). In some embodiments, the jig 100 can be used by a single worker to assemble a cabinet. In some embodiments, the jig 100 can be used to assembly other types of furniture, such dressers, chests of drawers, nightstands, tables, entertainment stands, hutches, armoires, etc. Thus, although described herein as a cabinet assembly jig, the jig 100 need not be limited to only to assembling cabinets. However, for ease of description here, several examples of using the jig 100 to assemble a cabinet are described herein. For example, as will be described in greater detail below, the worker can place the various panels that form the cabinet into the jig 100, and the jig 100 can clamp the panels together and further position the panels relative to the worker such that the worker can complete the assembly of the cabinet. In some embodiments, the jig 100 advantageously lifts and supports the cabinet during assembly. In some embodiments, the jig 100 advantageously deposits the assembled cabinet onto a conveyor assembly or system 115 such that the worker is not required to lift the assembled cabinet, greatly reducing the physical strain on the worker. In some embodiments, the jig 100 is operable by a single worker.

Figure 1B:
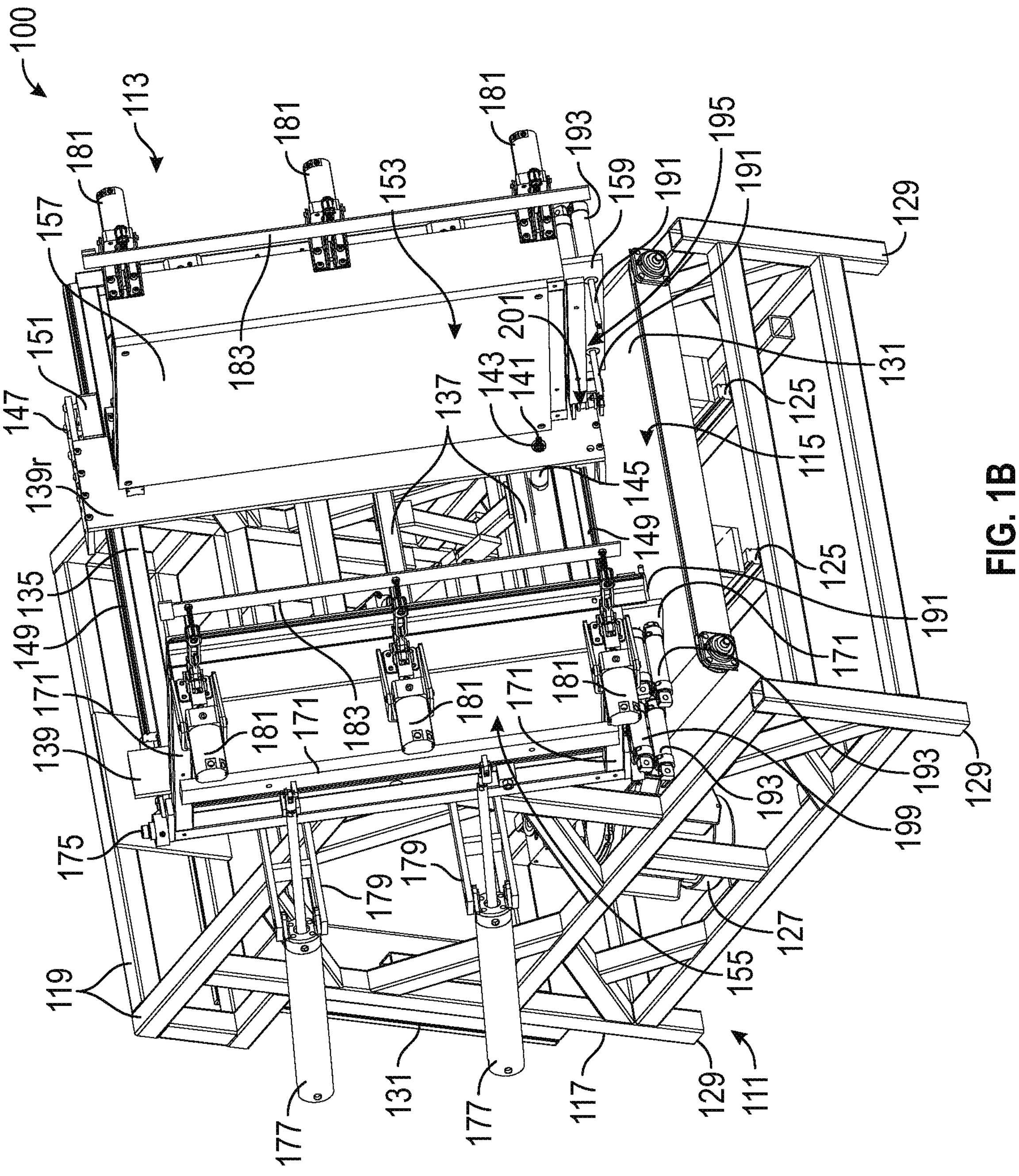
FIG. 1B is a second isometric view of the cabinet assembly jig in the first configuration.
Figure 1C:
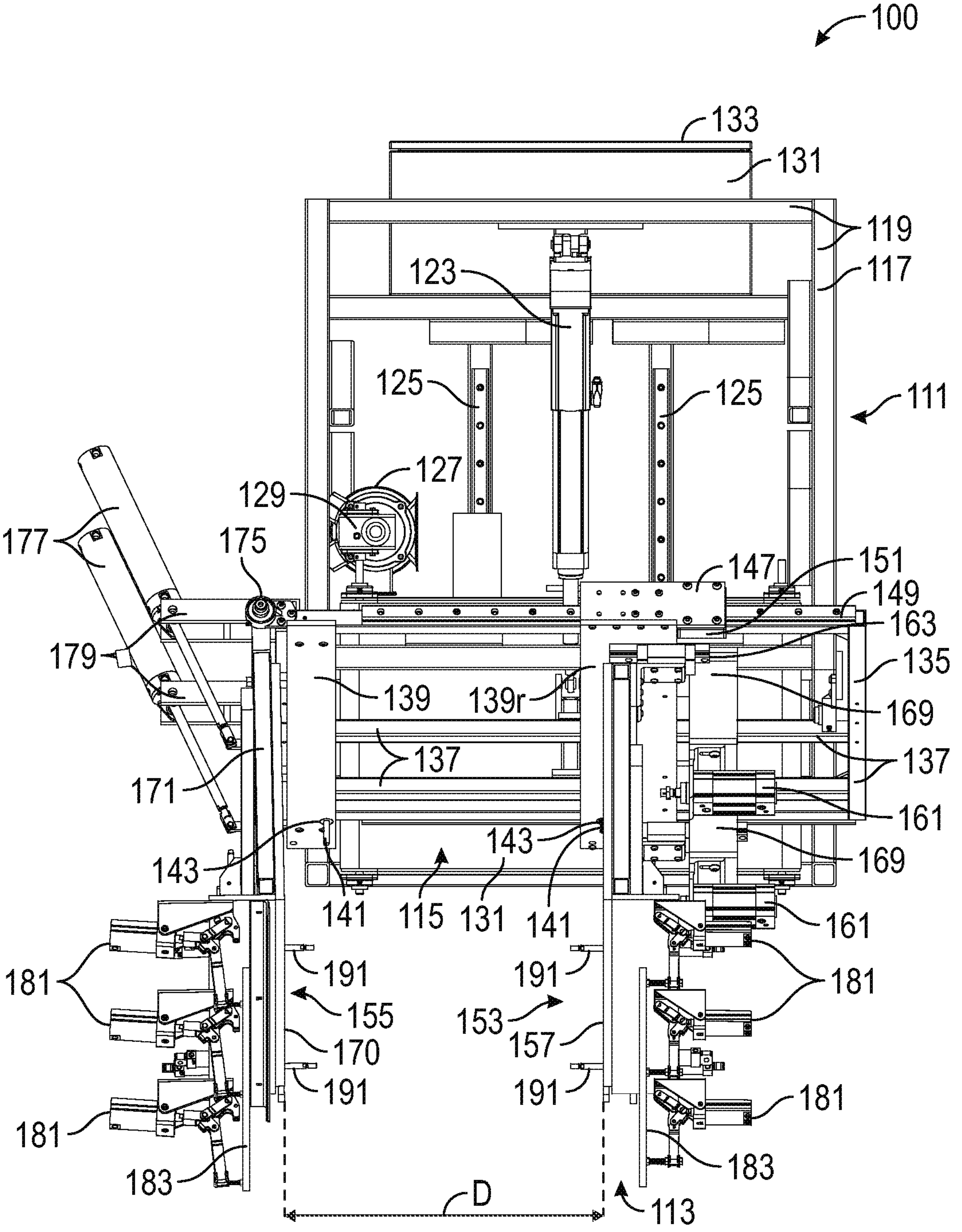
FIG. 1C is a top view of the cabinet assembly jig in the first configuration.
Figure 1D:
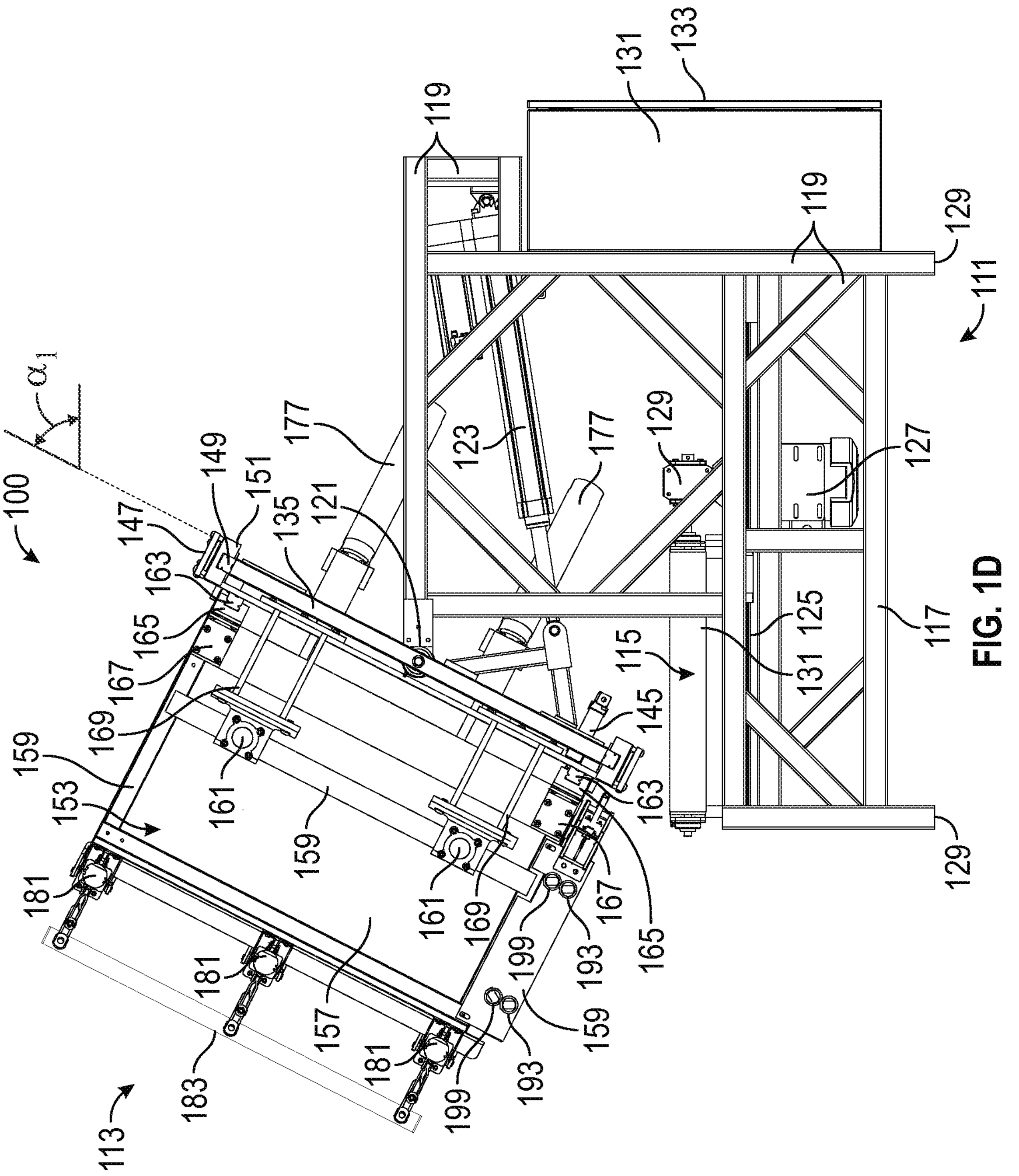
FIG. 1D is right side view of the cabinet assembly jig in the first configuration.
Figure 2A:
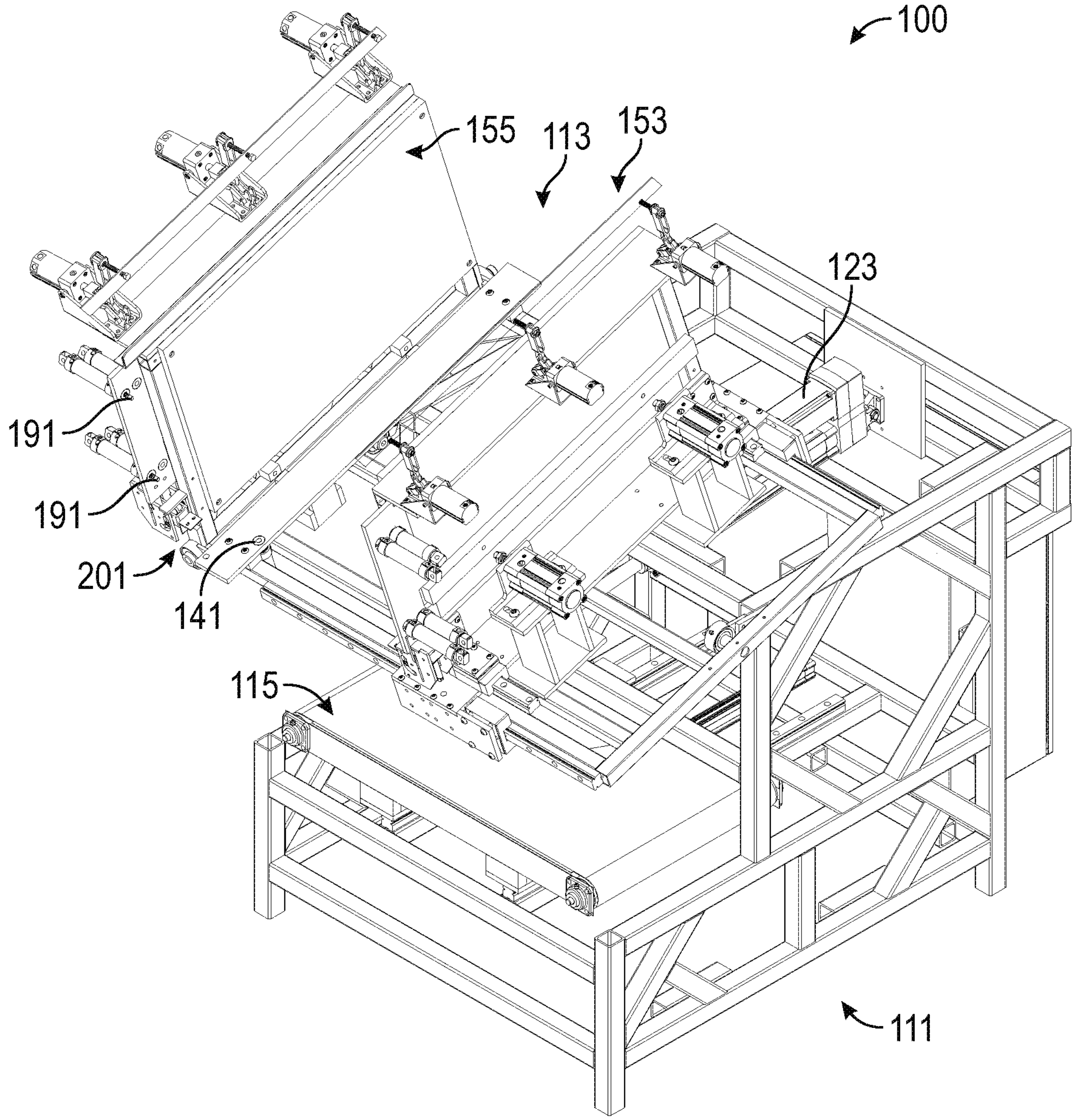
FIG. 2A is an isometric view of the cabinet assembly in a second configuration.
Figure 2B:
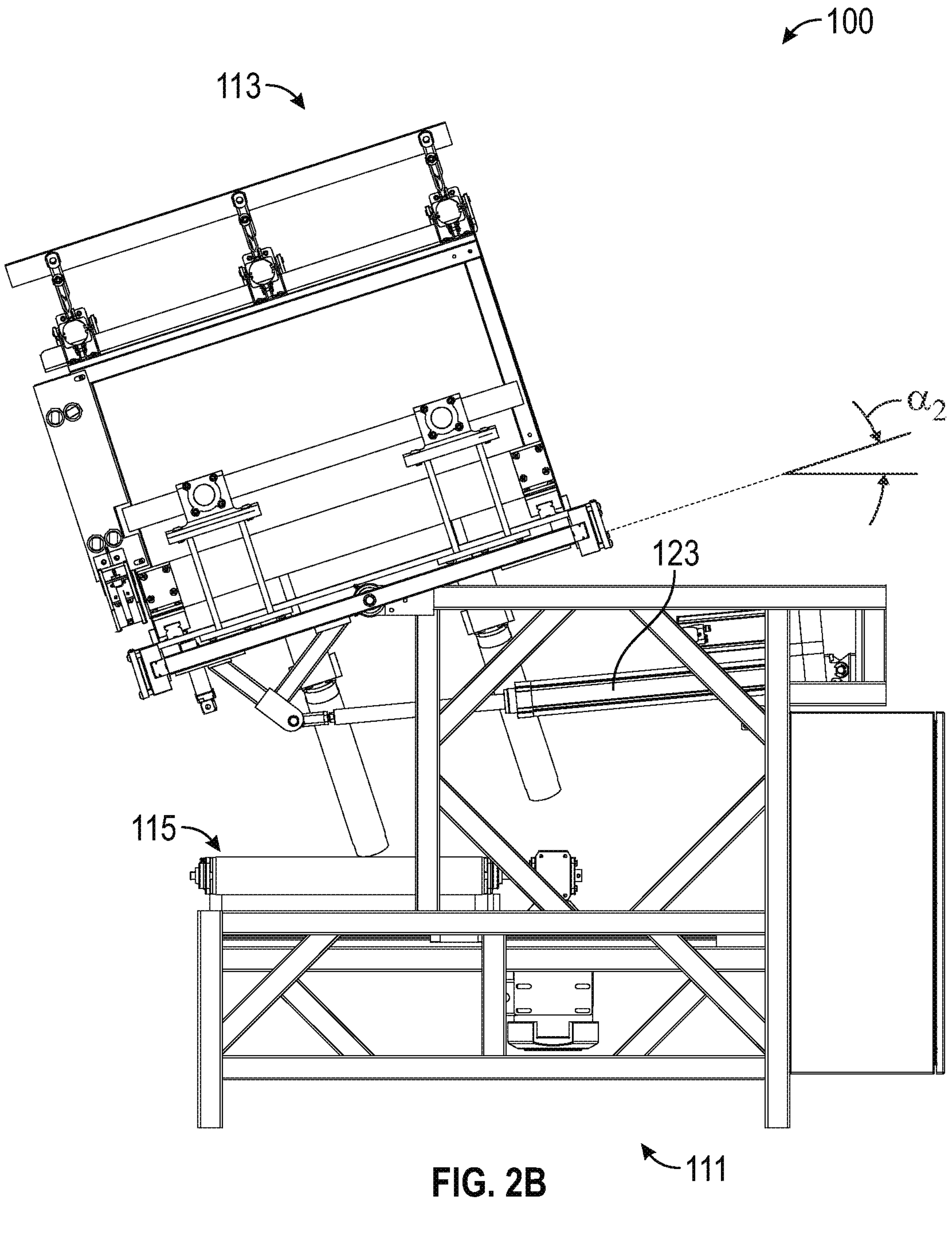
FIG. 2B is a right side view of the cabinet assembly jig in the second configuration.
Figure 3A:
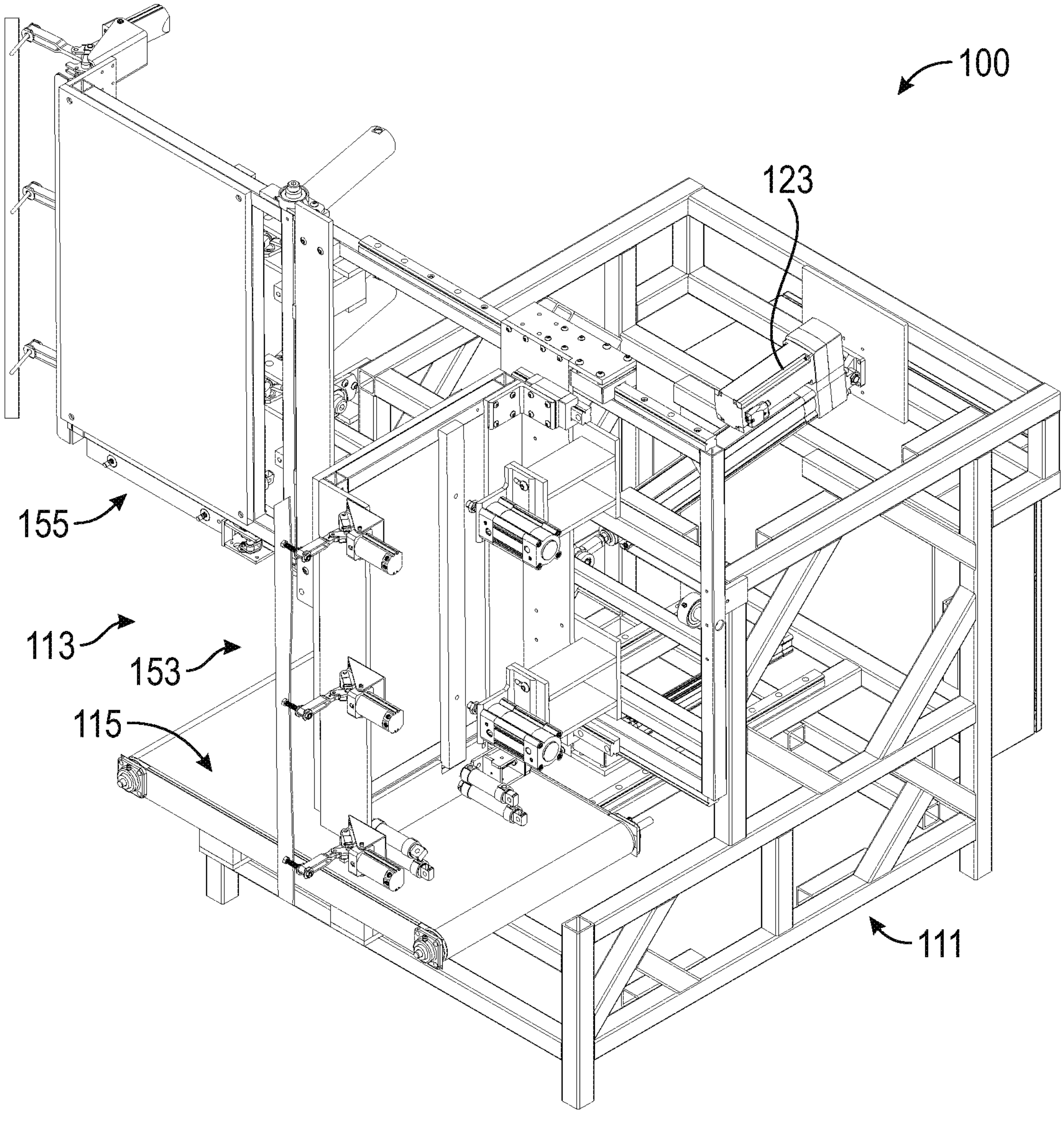
FIG. 3A is an isometric view of the cabinet assembly jig a third configuration.
Figure 3B:
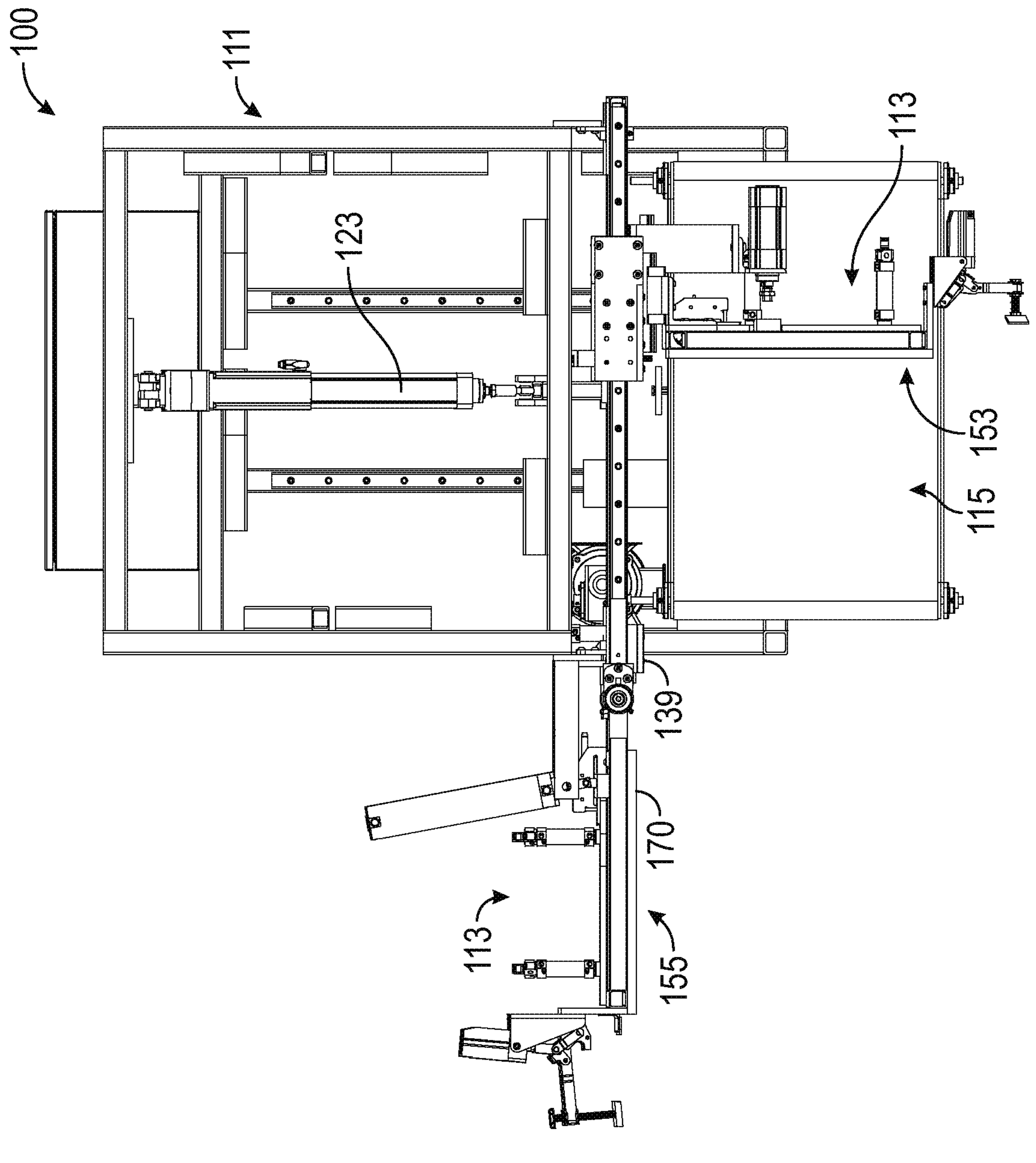
FIG. 3B is a top view of the cabinet assembly jig in the third configuration.
Figure 3C:
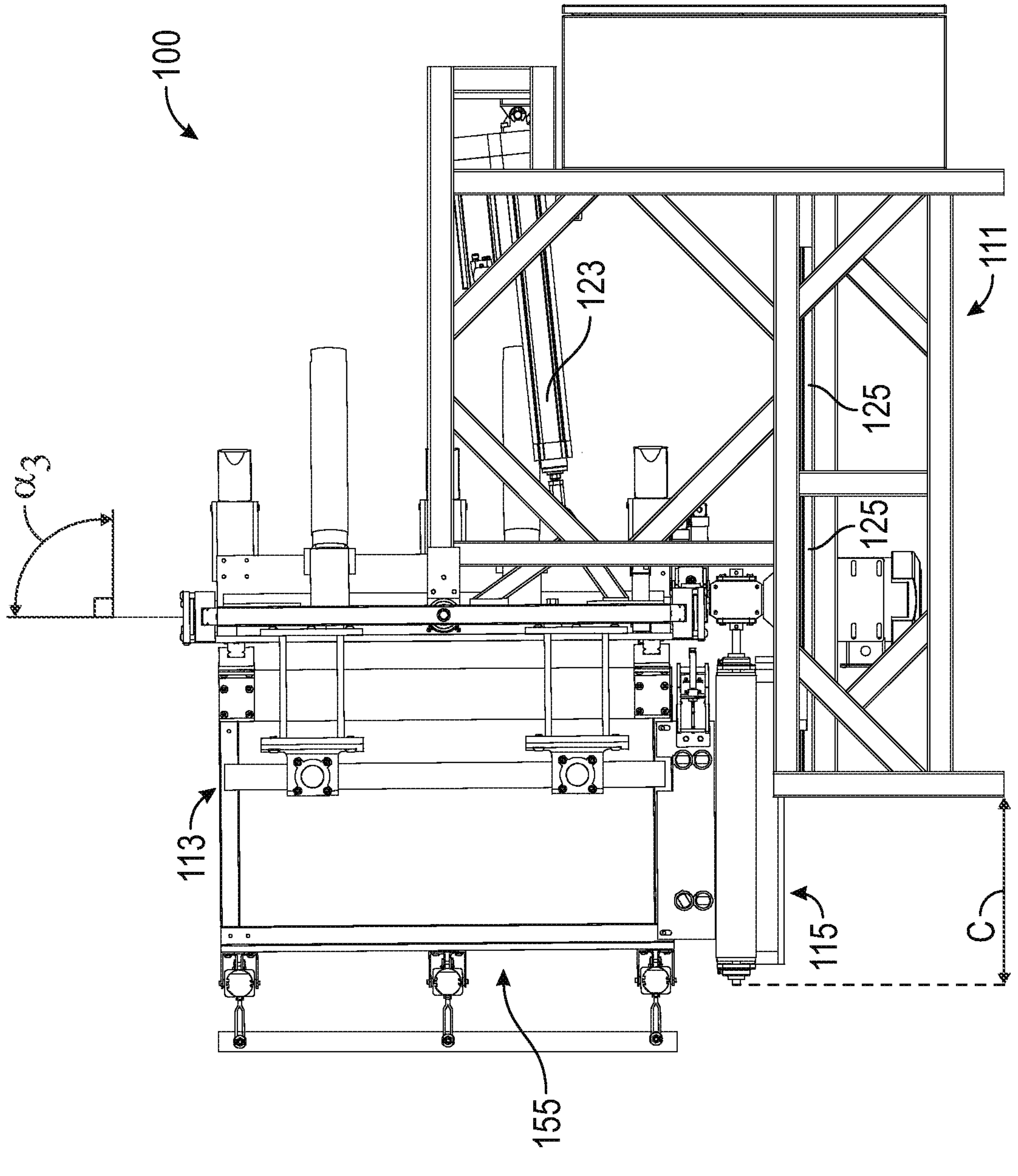
FIG. 3C is a right side view of the cabinet assembly jig in the third configuration.

FIGS. 1A-1D illustrate the jig 100 in a first configuration, FIGS. 2A and 2B illustrate the jig 100 in a second configuration, and FIGS. 3A-3C illustrate the jig 100 in a third configuration. The jig 100 can move between the first, second, and third configurations (and possibly other configurations) during various stages in the cabinet assembly processes. The different configurations orient the jig 100 such that the worker can perform various steps in the assembly process. An example method for assembling a cabinet using the jig 100 is shown in FIG. 8, and FIGS. 9A-9M illustrate a worker using the jig 100 at various stages in the cabinet assembly process. However, before describing the use of the jig 100 further, the jig 100 itself will first be described in detail with reference to FIGS. 1A-6.

As noted above, FIGS. 1A-1D illustrate the jig 100 in the first configuration. FIG. 1A is a first isometric view, FIG. 1B is a second isometric view, FIG. 1C is a top view, and FIG. 1D is a right side view. In the illustrated embodiment, the jig 100 includes a base 111, a clamp assembly 113, and a conveyor system 115.

The base 111 can comprise a frame structure 117. The frame structure 117 can include a plurality of connected supports 119. The supports 119 can comprise interconnected beams and/or tubes. The supports 119 can have square, circular, or any other cross-sectional shape. In some embodiments, the supports 119 are welded together to form the frame structure 117. In some embodiments, other methods for joining the supports 119 are used, such as mechanical fasteners, for example. In some embodiments, the supports 119 comprise steel, although use of other materials (including other metals and non-metal materials) is also possible and within the scope of this disclosure.

The base 111 is configured to support the clamp assembly 113. For example, in the illustrated embodiment, the clamp assembly 113 is pivotally connected to the base 111 at a joint 121 (as best seen in the right side view of FIG. 1D). An actuator 123 extends between the base 111 and the clamp assembly 113. As will be described below, the joint 121 and the actuator 123 are configured to allow the clamp assembly 113 to pivot relative to the base 111 (for example, compare the position of the clamp assembly 113 in the right side views of FIGS. 1D, 2B, and 3C).

Figure 10:
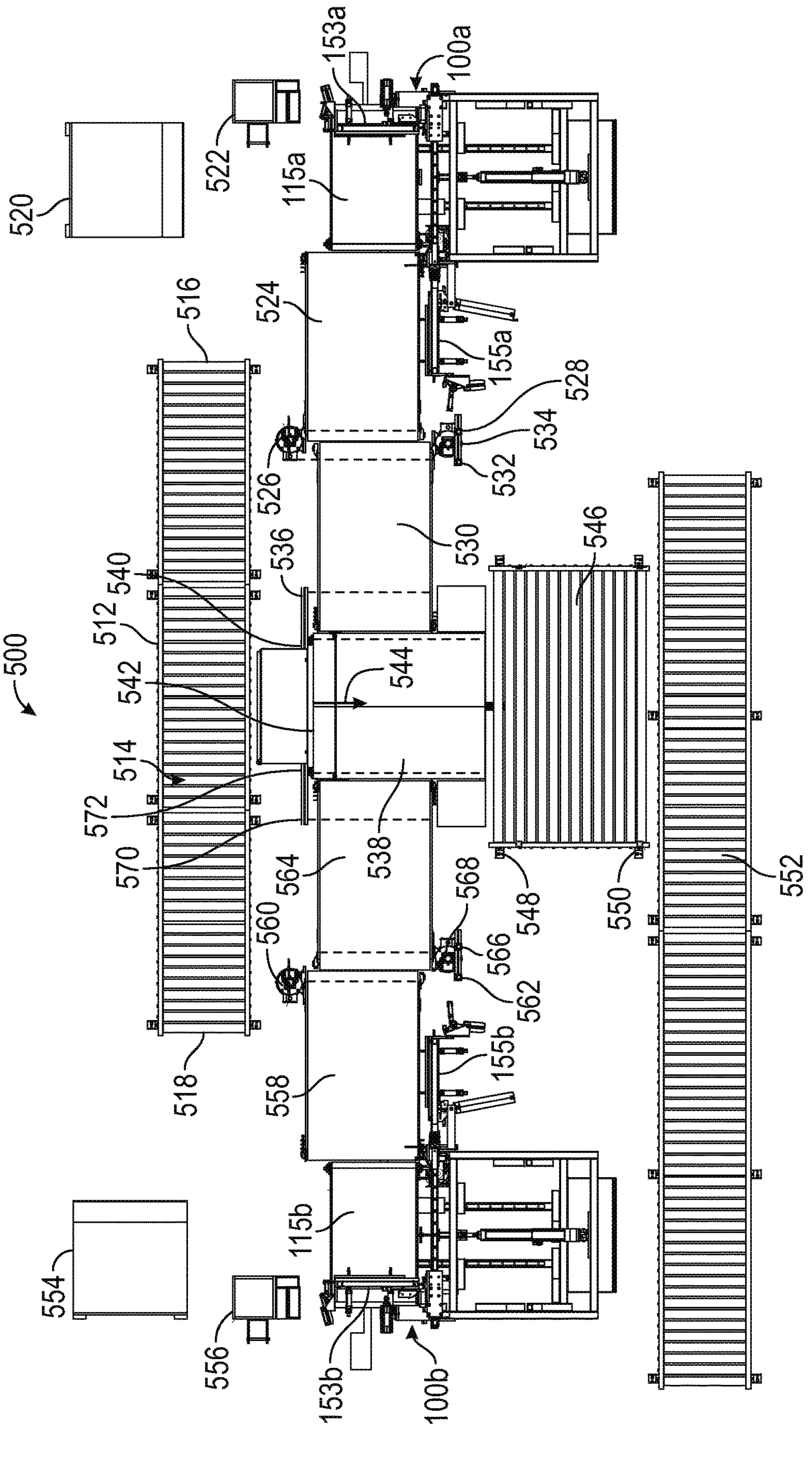
FIG. 10 is a plan view of an embodiment of an assembly cell comprising two cabinet assembly jigs and a system of conveyors.

The base 111 also is configured to support the conveyor system 115. For example, the base 111 can include rails 125 on which the conveyor system 115 is mounted. As will be described below, the conveyor system 115 can slide along the rails 125 to move between a retracted configuration (for example, as shown in FIGS. 1A-2B) and an extended configuration (for example, as shown in FIGS. 3A-3C). In the illustrated embodiment, the conveyor system 115 includes a motor 127 and a gearbox 129 configured to drive a belt 131. The belt 131 can be mounted on rollers. In use, once a cabinet has been assembled, the jig 100 deposits the cabinet onto the belt 131. The motor 127 and the gearbox 129 then drive the belt 131 to move the cabinet away from the jig 100. As shown in FIG. 10, the jig 100 may be deployed as part of a cell 500, and the conveyor system 115 can move the cabinet away from the jig 100 and to another part of the cell 500.

The base 111 can also define a portion or portions having a lower surface which define a support plane. For example, the portions may include feet 129. In use, the lower surface of the feet 129 may contact a support surface on which the base 111 rests. In this instance, the support plane essentially includes the support surface. In some embodiments, the support surface is the ground or the floor. The base 111 can also support a box 131. The box 131 can be attached to a back portion of the base 111, although other positions for the box 131 on the base 111 are possible. In some embodiments, the box 131 is configured to enclose one or more of the electrical (or other types of) components of the jig 100. The box 131 can include a door 133 that allows access to the interior of the box 131. Although a specific embodiment of the base 111 is illustrated in the figures, this disclosure is not intended to be limited to only the illustrated embodiment of the base 111. The base 111 can be embodied in a wide variety of configurations that achieve the functionality disclosed herein, all of which are intended to be within the scope of this disclosure.

The clamp assembly 113 is configured to support, clamp, and orient (relative to the worker operating the jig 100) the various panels that form the cabinet. In the illustrated embodiment, the clamp assembly 113 includes a frame 135. The frame 135 can comprise a plurality of interconnected supports 137. The supports 137 can comprise beams and/or tubes. The supports 137 can have square, circular, or any other cross-sectional shape. In some embodiments, the supports 137 are welded together to from the frame 135. In some embodiments, other methods for joining the supports 137 are used, such as mechanical fasteners. In some embodiments, the supports 137 comprise steel, although use of other materials (including other metals and non-metal materials) is also possible and within the scope of this disclosure.

In the illustrated embodiment, the clamp assembly 113 includes two front support plates 139 mounted on the frame 135. Although two front support plates 139 are included in the illustrated embodiment, other numbers of front support plates 139 can be used, including one, two, three, four, five, or more front support plates 139. In some embodiments, the front support plates 139 provide a substantially planar surface against which the front panel (or fascia) of a cabinet can be placed during assembly (see, for example, FIG. 9A, described below).

In the illustrated embodiment, the rightmost front support plate 139 (designated 139*r* in FIGS. 1A-1D) is attached to carriages 147. The carriages 147 can be moveably mounted on rails 149 which are attached to the frame 135. By moving the carriages 147 along the rails, the distance between the front support plates 139 and the position of the front support plate 139*r* can be varied. As will be described below, this can allow the jig 100 to be used to assemble cabinets of different widths. The carriages 147 can include brakes 151 that can lock the carriages 147 in place relative to the rails 149. In some embodiments, the left support plate 139, both the left and right support plates 139, or neither are mounted on carriages 147.

In the illustrated embodiment, each front support plate 139 includes an opening 143 through which a rod 141 extends. In a preferred embodiment, the rods 141 have a circular cross-section, although other cross-sections (e.g., square, oval, etc.) are possible. In some embodiments, each of the openings 143 and the rods 141 are positioned on the front support plates 139 so as to be at the same vertical level relative to each other. The rods 141 are configured to support the bottom of the front panel of the cabinet when placed into the jig 100. That is, a worker can position the front panel of the cabinet against the front support plates 139 and the front panel of the cabinet can be supported from below by the rods 141 (see FIG. 9A, for example). The rods 141 can be connected to actuators 145. The actuators 145 can be configured to extend and retract the rods 141. For example, the rods 141 are illustrated in an extended position in FIGS. 1A-1D (the first configuration of the jig 100) and in a retracted position in FIGS. 2A-3C (the second and third configurations of the jig 100). In some embodiments, the actuators 145 are linear actuators. In some embodiments, the actuators 145 are electro-mechanical actuators, pneumatic actuators, or hydraulic actuators. In some embodiments, the actuators 145 comprise solenoids. The actuators 145 can be attached to the back surface of the front support plates 139 and/or the frame 135. The rods 141 merely provide one example of a mechanism for support the front panel of the cabinet. Other embodiments are possible. For example, the jig 100 could include supports (e.g., support plates) which rotate up into place, instead of rods 141 that extend and retract.

The clamp assembly 113 also includes a first gripper, such as a first jaw 153, and a second gripper, such as a second jaw 155. The first jaw 153 and the second jaw 155 can each supported by the frame 135. In the illustrated embodiment, the first jaw 153 includes a side support plate 157. In some embodiments, the side support plate 157 provides a substantially planar surface against which a side panel of a cabinet can be placed during assembly (see, for example, FIG. 9B). The side support plate 157 can be mounted on a frame 159. The frame 159 can comprise a plurality of interconnected supports. The supports can comprise beams, tubes, and or plates. The supports can have square, circular, or any other cross-sectional shape. In some embodiments, the supports are welded together to from the frame 159. In some embodiments, other methods for joining the supports are used, such as mechanical fasteners. In some embodiments, the supports comprise steel, although use of other materials (including other metals and non-metal materials) is also possible and within the scope of this disclosure. The frame 159 can be attached to actuators 161. In the illustrated embodiment, two actuators 161 are used, but in other embodiments, other numbers of actuators 161, including one, two, three, four, or more actuators 161, can be used. In some embodiments, the actuators 161 are linear actuators. In some embodiments, the actuators 161 are electro-mechanical actuators, pneumatic actuators, or hydraulic actuators. In some embodiments, the actuators 161 comprise solenoids. In some embodiments, the actuators 161 are operable to move the side support plate 157 backward and forwards along an axis normal to the side support plate 157. In other words, the actuators 161 are operable to move the side support plate 157 backward and forwards towards the second jaw 155. As will be described below, the actuators 161 are operable to apply a clamping force between the first jaw 153 and the second jaw 155.

In the illustrated embodiment, the side support plate 157 is further supported by rails 163 which are attached to the rightmost front support plate 139*r*. For example, the side support plate 157 can be attached to carriages 165 by brackets 167. The carriages 165 can be moveably mounted on the rails 163. The carriages 165 can slide along the rails 163 as the actuators 161 move the side support plate 157 backward and forward. Because the rails 163 are attached to the front support plate 139*r*, the rails 163 move with the front support plate 139*r* along the rails 149. In some embodiments, the brackets 167 support the side support plate 157 at a 90-degree angle relative to the frame 135 and the front support plates 139. In some embodiments, the side support plate 157 of the first jaw 153 is fixed at the 90-degree angle.

In the illustrated embodiment, the actuators 161 are supported by brackets 169. In the illustrated embodiment, the brackets 169 are attached to the rear surface of the rightmost front support plate 139*r*. Thus, the brackets 169, actuators 161, and side support plate 157 move with the front support plate 139*r* along the rails 149. In some embodiments, this allows a distance D (as shown in FIG. 1C) between the first jaw 153 and the second jaw 155 to be varied. In some embodiments, the distance D can be adjusted from between 0 inches and up to 96 inches, up to 84 inches, up to 72 inches, up to 60 inches, and up to 48 inches. In some embodiments, the distance D can be adjusted by at least or up to ¾th the width of the frame 135, at least or up to ¾ the width of the frame 135, at least or up to ½ the width of the frame 135, at least or up to ¼ the width of the frame 135, at least or up to ⅛ the width of the frame 135, or greater or smaller fractions of the width of the frame 135 as well as all ranges between the listed values. Other distances and ranges are also possible. Accordingly, the jig 100 can be adjusted to various distances D to accommodate assembly of cabinets of different widths. Additionally, it should be noted that the distance D can be further varied by operation of the actuators 161 moving the side support plate 157 backwards and forwards along the rails 163. In some embodiments, the actuators 161 allow for an additional adjustment of at least 0.25 inches, at least 0.5 inches. at least 0.75 inches, at least 1.0 inches, at least 1.5 inches, at least 2.0 inches, at least, 2.5 inches, at least 3 inches, at least 3.5 inches, at least 4.0 inches, at least 5.0 inches, at least 6.0 inches or larger. This additional adjustment allows the first jaw 153 to move towards the second jaw 155 to provide a clamping force used during assembly. In some embodiments, the actuators 161 allow for an additional adjustment of at least or up to 1/20th, 1/15th, 1/12th, 1/10th, ⅛th, ⅙th, or ¼th the distance D, as well as all ranges between the listed values.

The second jaw 155 also includes a side support plate 170. In some embodiments, the side support plate 170 provides a mating surface or surfaces, such as a substantially planar surface, against which a side panel of a cabinet can be placed during assembly (see, for example, FIG. 9B). The side support plate 170 can be mounted on a frame 171. The frame 171 can comprise a plurality of interconnected supports. The supports can comprise beams, tubes, and or plates. The supports can have square, circular, or any other cross-sectional shape. In some embodiments, the supports are welded together to from the frame 171. In some embodiments, other methods for joining the supports are used, such as mechanical fasteners. In some embodiments, the supports comprise steel, although use of other materials (including other metals and non-metal materials) is also possible and within the scope of this disclosure. The frame 171 of the second jaw 155 is attached to the frame 135 at a joint 175. The joint 175 is configured to allow the second jaw 155 to pivot relative to the frame 135 (compare, for example, the position of the second jaw 155 in FIGS. 1C and 3B). For example, in the illustrated embodiment, the joint 175 allows the second jaw 155 to pivot from the position shown in FIGS. 1A-2B (the first and second configurations of the jig 100), where the second jaw 155 is at a 90-degree angle relative to the frame 135 and the front support plates 139, and the position shown in FIGS. 3A-3C (the third configuration of the jig 100), where the second jaw 155 is substantially aligned with (or parallel to) the frame 135 and the front support plates 139.

In the illustrated embodiment, the jig 100 includes actuators 177 operable to cause the second jaw 155 to pivot around the joint 175. In some embodiments, the actuators 177 are linear actuators. In some embodiments, the actuators 177 are electro-mechanical actuators, pneumatic actuators, or hydraulic actuators. In some embodiments, the actuators 177 comprise solenoids. In some embodiments, the actuators 177 extend between brackets 179 that are attached to the frame 135 and the frame 171 of the second jaw 155.

In the illustrated embodiments, the first jaw 153 and the second jaw 155 each include end clamps 181 and an end clamp bar 183. In the illustrated embodiment, each of the first jaw 153 and the second jaw 155 includes three end clamps 181, although, in other embodiments, other numbers of end clamps 181 can be used, for example, one, two, three, four, five, or more end clamps 181. The end clamps 181 are positioned along the distal end of the first jaw 153 and the second jaw 155. Each of the end clamps 181 is attached to an end clamp bar 183. The end clamps 181 are operable to apply a clamping force with the end clamp bar 183 in a direction that is parallel to the side support plates 157, 170 and towards the frame 135 and front support plates 139 (see, for example, FIG. 9C, discussed below). The clamping force applied by the end clamps 181 can be used, for example, to press the side panels of the cabinet into corresponding grooves on the front panel.

Figure 4:
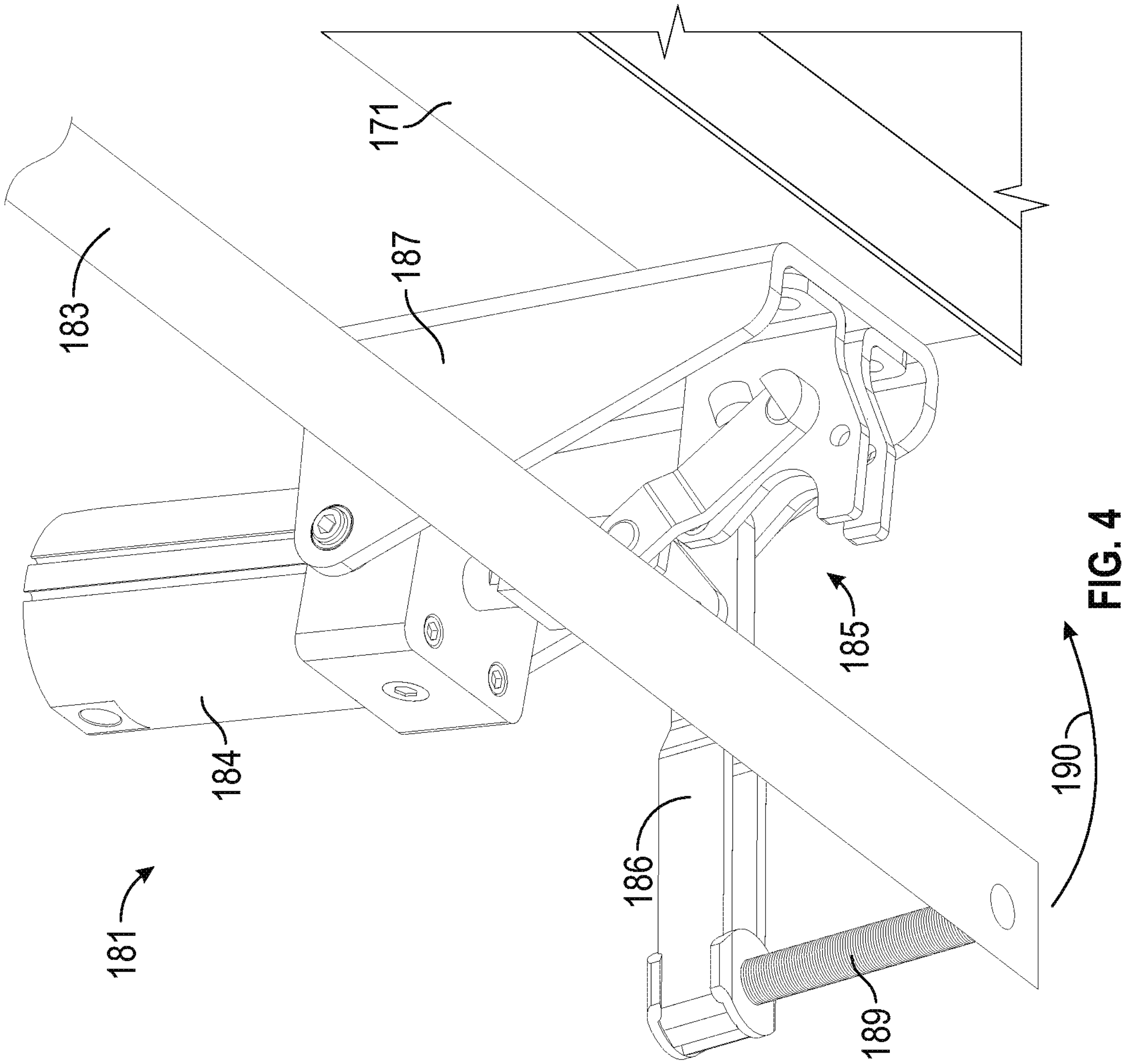
FIG. 4 is an isometric detail view of an embodiment of an end clamp for the cabinet assembly jig.

FIG. 4 is an isometric detail view of an embodiment of an end clamp 181 for the cabinet assembly jig 100. A portion of the end clamp bar 183 is also illustrated. In the illustrated embodiment, the end clamp 181 is mounted to the frame 171 of the second jaw 155 via a bracket 187. The bracket 187 is attached to an actuator 184 and a linkage assembly 185. In some embodiments, the actuator 184 is a linear actuator. In some embodiments, the actuator 184 is an electro-mechanical actuator, a pneumatic actuator, or a hydraulic actuator. In some embodiments, the actuator 184 comprises a solenoid. The actuator 184 is operable to cause the linkage assembly 185, including arm 186 to rotate around the distal end of the second jaw 155 in the direction of arrow 190. An extender 189 extends from a distal end of the arm 186 and is connected to the end clamp bar 183. Thus, the actuator 184 is operable to cause the end clamp bar 183 to move in the direction of the arrow 190. Although FIG. 4 shows an embodiment of an end clamp 181 on the second jaw 155, this description is also applicable to the end clamps 181 on the first jaw 153. Additionally, although FIG. 4 illustrates a specific mechanism for the end clamps 181, this disclosure is not intended to be limited to only the illustrated embodiments. In general, each of the end clamps 181 on each of the first jaw 153 and the second jaw 155 operate together to move the end clamp bars 183 in unison. In some embodiments, the end clamp bars 183 comprise a flat strip. In some embodiments, the end clamp bars 183 comprise a round or square bar. In some embodiments, the end clamp bars 183 are omitted.

Returning to the embodiment illustrated in FIGS. 1A-1D, the first jaw 153 and the second jaw 155 each include a pair of rods 191 that extend through the frames 159, 171, respectively. The rods 191 can each extend along an axis that is normal to the side support surfaces 157, 170. In some embodiments, each pair of rods 191 is parallel. In a preferred embodiment, the rods 191 have a circular cross-section, although other cross-sections (e.g., square, oval, etc.) are possible. The pair of rods 191 on each of the first jaw 152 and the second jaw 155 are positioned so as to be an equal distance from the bottom edge of the first jaw 153 and the second jaw 155. Or, stated another way, the pair of rods 191 each lie on an axis that is normal to the front support plates 139. The rods 191 are configured to support the bottom of the side panels of the cabinet when placed into the jig 100 (see, for example, FIG. 9B). That is, a worker can position the side panels of the cabinet against the side support plates 157, 170 and the side panels of the cabinet can be supported from below by the rods 191. The rods 191 can be connected to actuators 191. The actuators 193 can be configured to extend and retract the rods 191. In the extend position the rods 191 support the side panels of the cabinet. The rods 191 can be retracted so that they do not support the cabinet. For example, the rods 191 are illustrated in an extended position in FIGS. 1A-1D (the first configuration of the jig 100) and in a retracted position in FIGS. 2A-3C (the second and third configurations of the jig 100). In some embodiments, the actuators 193 are linear actuators. In some embodiments, the actuators 193 are electro-mechanical actuators, pneumatic actuators, or hydraulic actuators. In some embodiments, the actuators 193 comprise solenoids. The actuators 193 can be attached to the back surface of the frames 159, 171. The rods 191 and actuators 193 on the second jaw 155 are also shown in the detail view of FIG. 5. The rods 191 merely provide one example of a mechanism for support the side panels of the cabinet. Other embodiments are possible. For example, the jig 100 could include supports which rotate up into place, instead of rods 191 that extend and retract.

Figure 5:
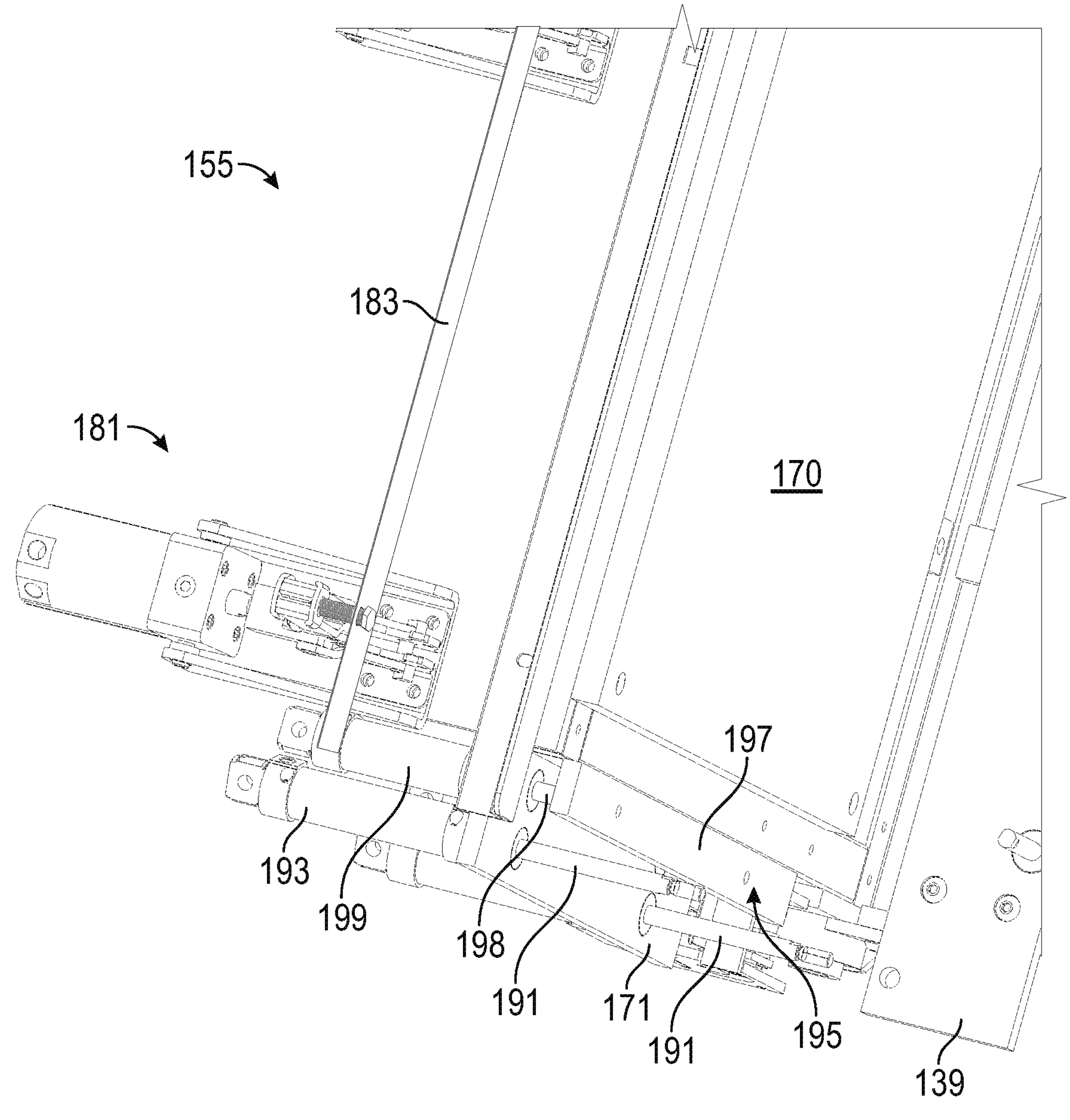
FIG. 5 is an isometric detail view of an embodiment of a carton clamp for the cabinet assembly jig in a retracted configuration.
Figure 9A:
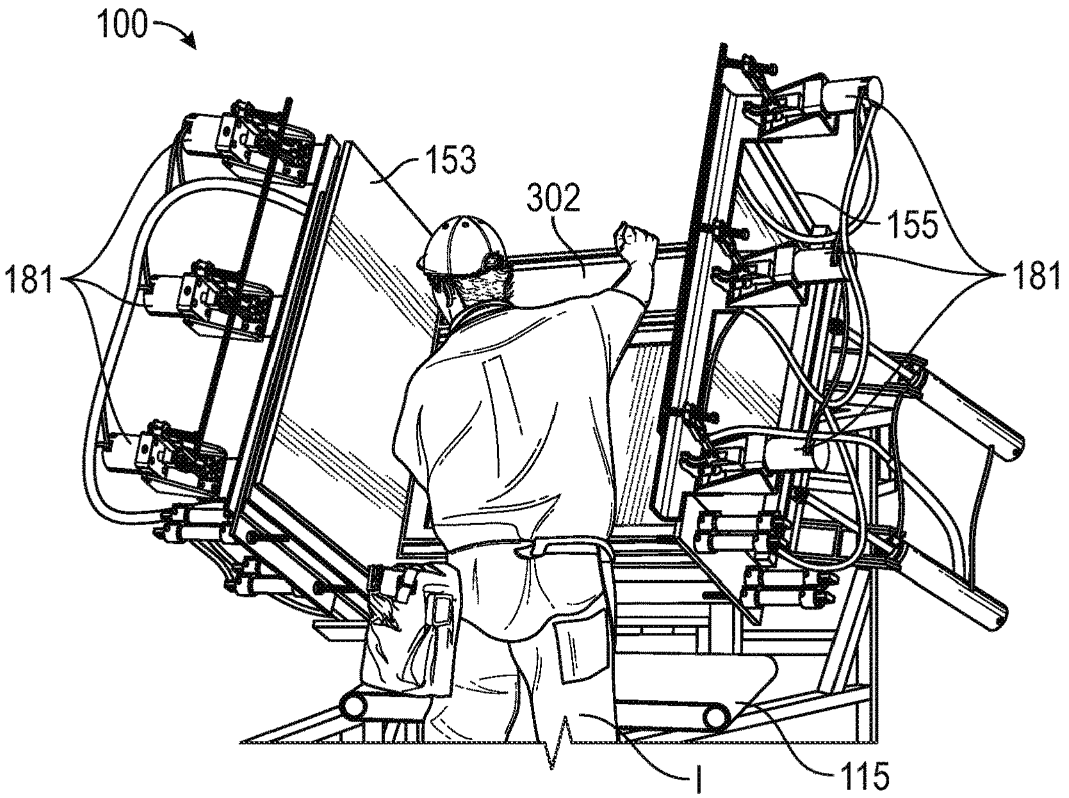
FIG. 9A illustrates an example of the worker positioning a front panel of the cabinet in the cabinet assembly jig.
Figure 9B:
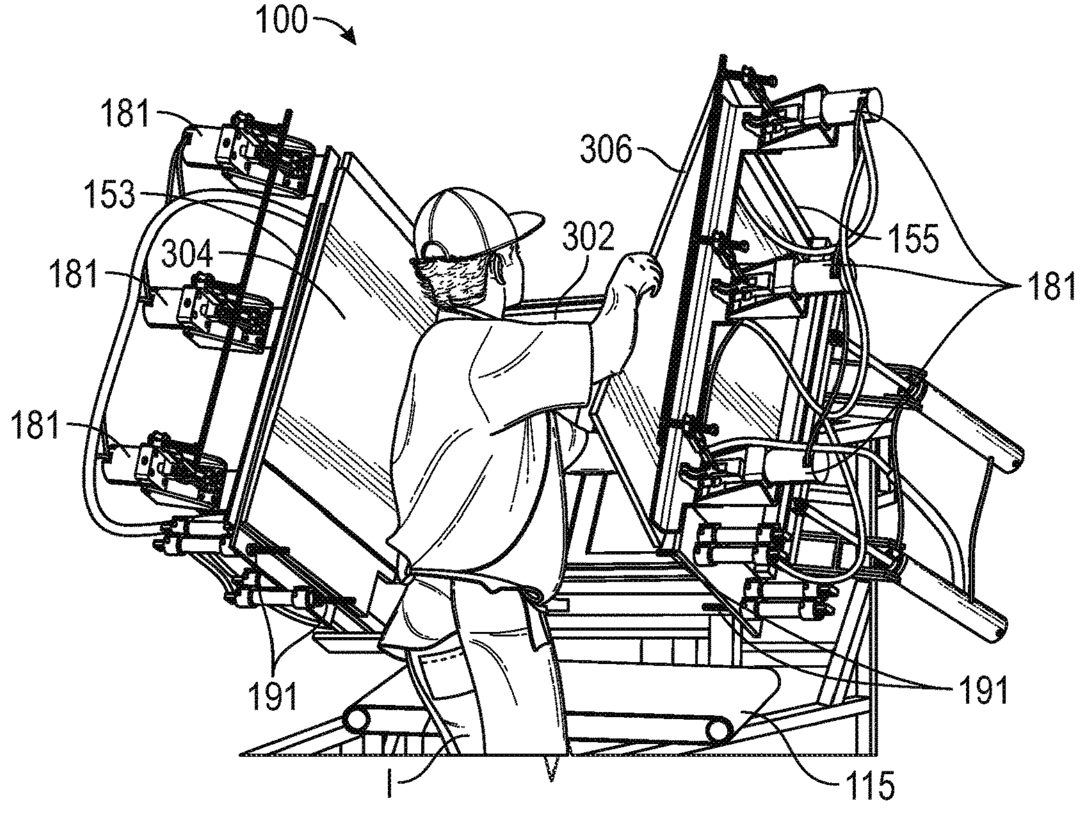
FIG. 9B illustrates an example of the worker positioning a second side panel in the cabinet assembly jig. The first side panel is illustrated already positioned in the cabinet assembly jig.
Figure 9C:
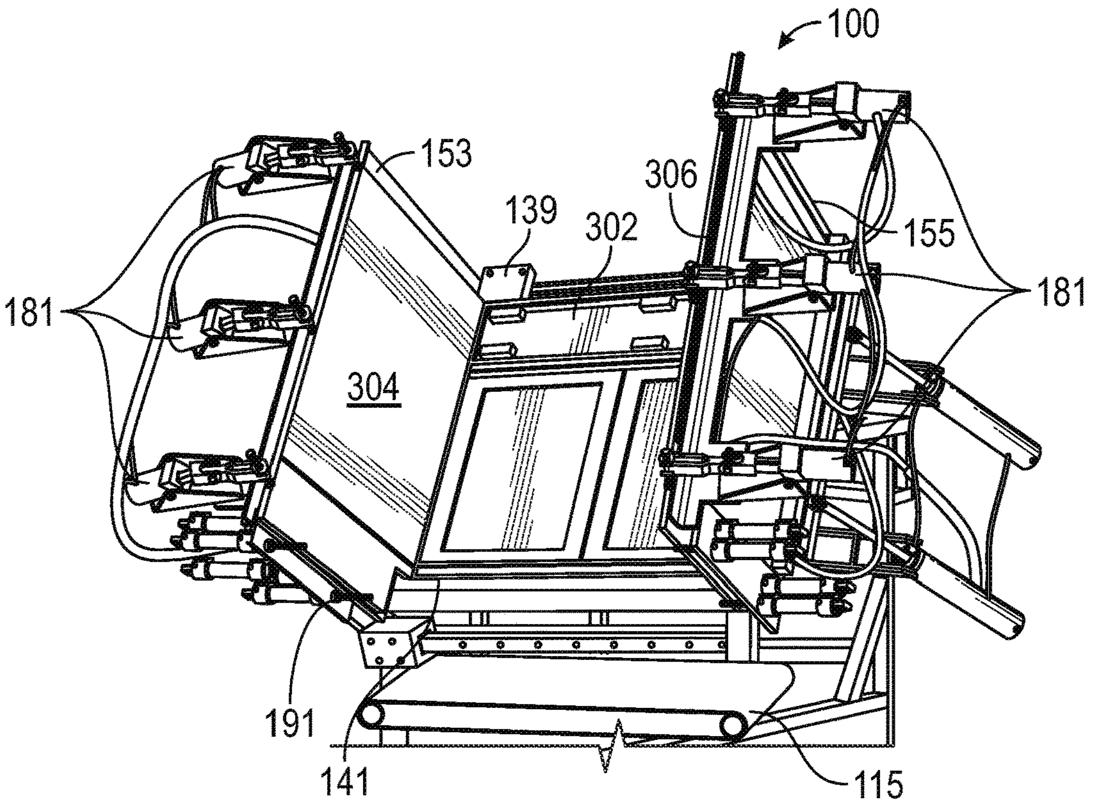
FIG. 9C illustrates an example of the cabinet assembly jig with the end clamps rotated closed to provide pressure that clamps the side panels into grooves on the front panel of the cabinet.
Figure 9D:
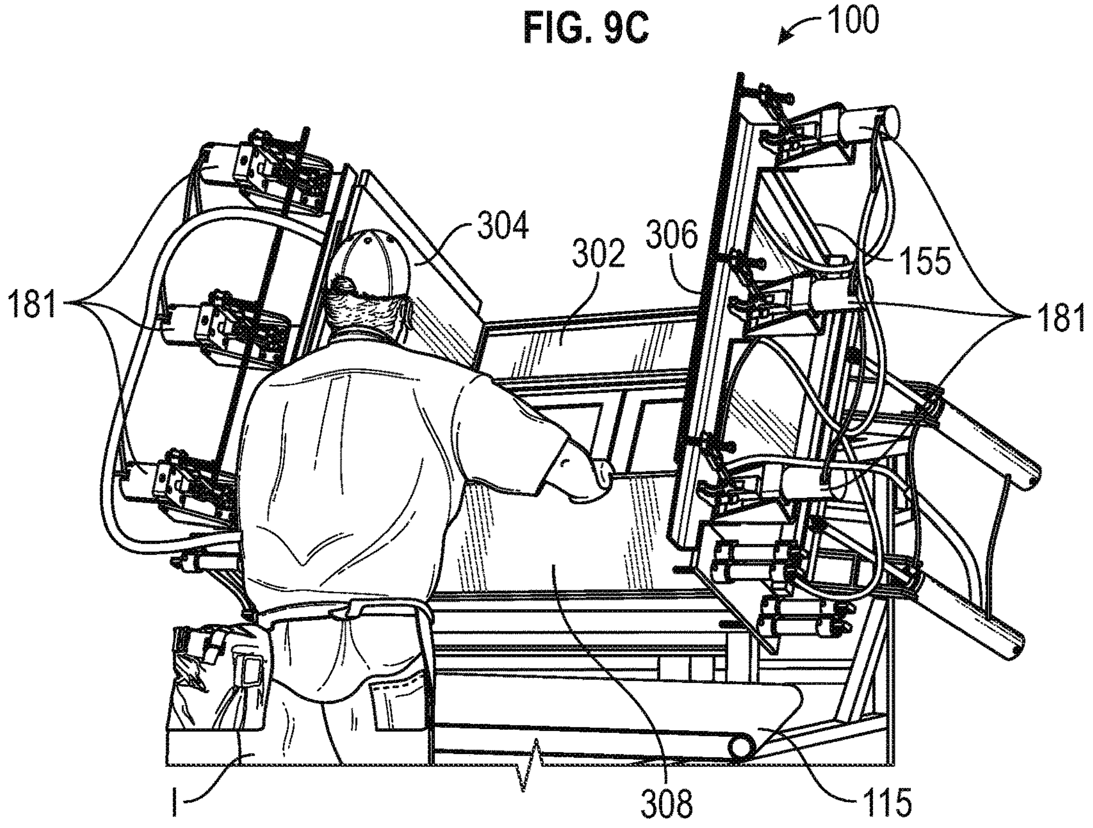
FIG. 9D illustrates an example of the worker positioning the bottom panel of the cabinet into the cabinet assembly jig. The bottom panel is positioned into grooves on the front and side panels.
Figure 9E:
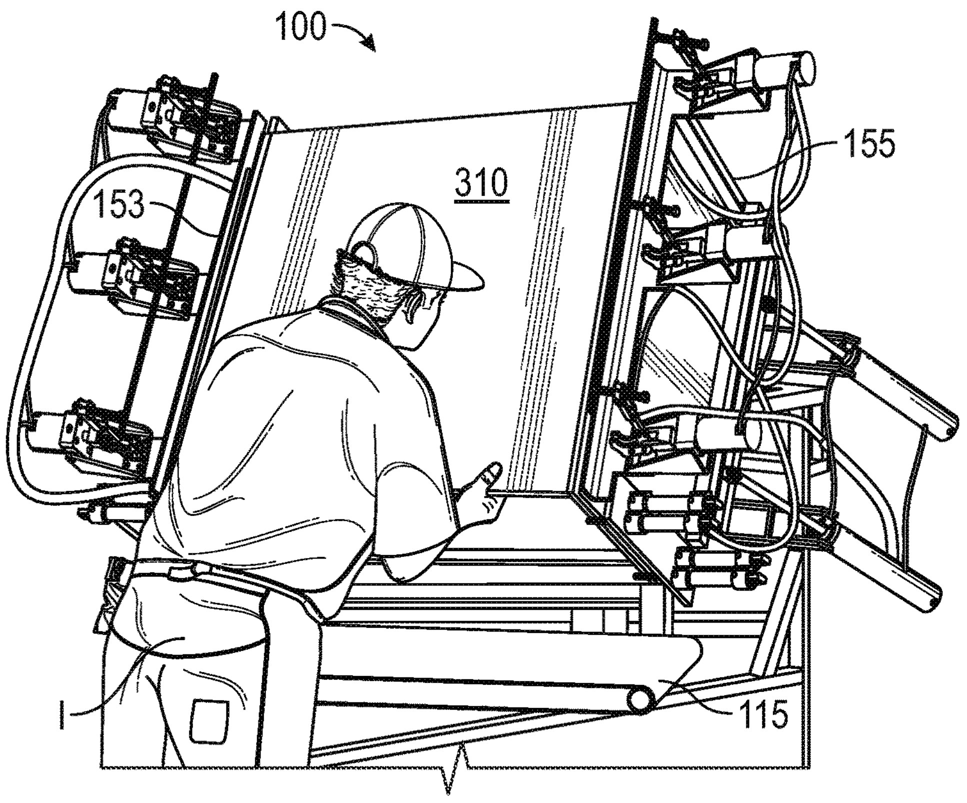
FIG. 9E illustrates an example of the worker positioning the back panel into the cabinet assembly jig. The back panel is positioned such that grooves on the sides of the back panel mate with grooves on the side panels and the bottom panel is received in a groove on the inner surface of the back panel.
Figure 9F:
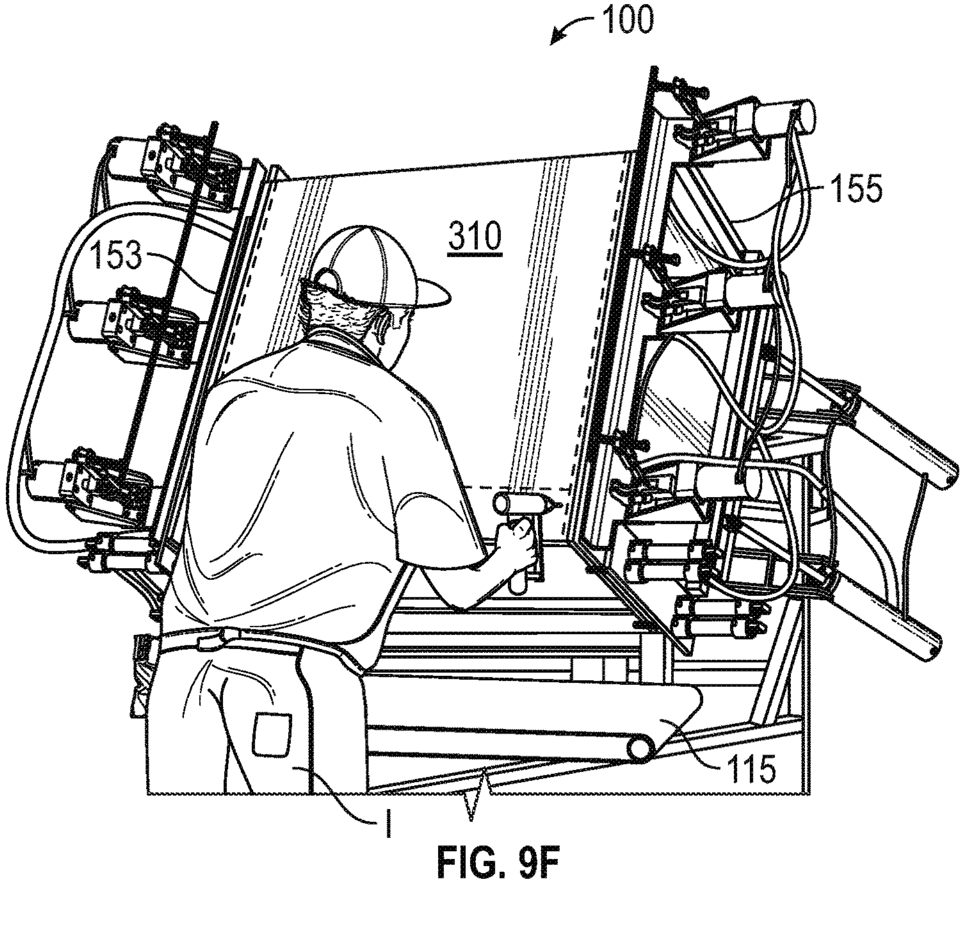
FIG. 9F illustrates an example of the worker stapling the back panel to the side panels and the bottom panel.
Figure 9G:
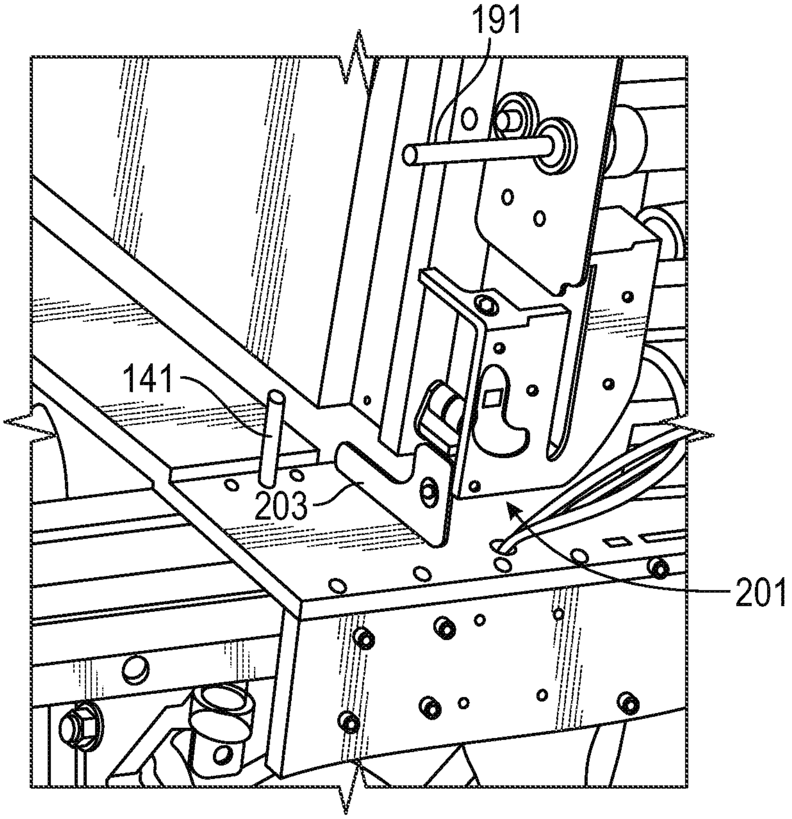
FIG. 9G illustrates an example of a toe kick support of the cabinet assembly jig in a retracted position.
Figure 9H:
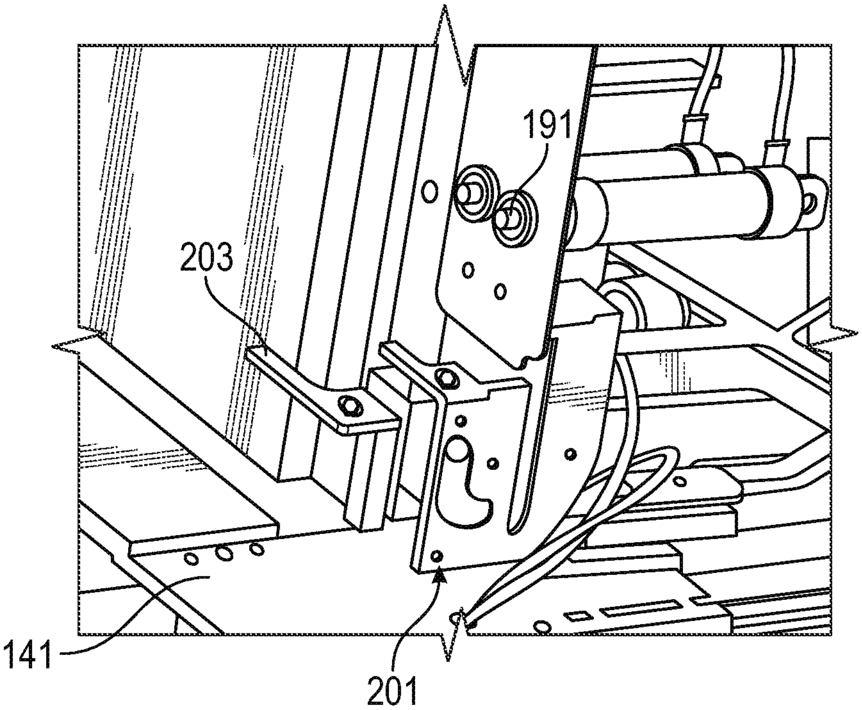
FIG. 9H illustrates an example of the toe kick support of the cabinet assembly jig in an extended position.
Figure 9I:
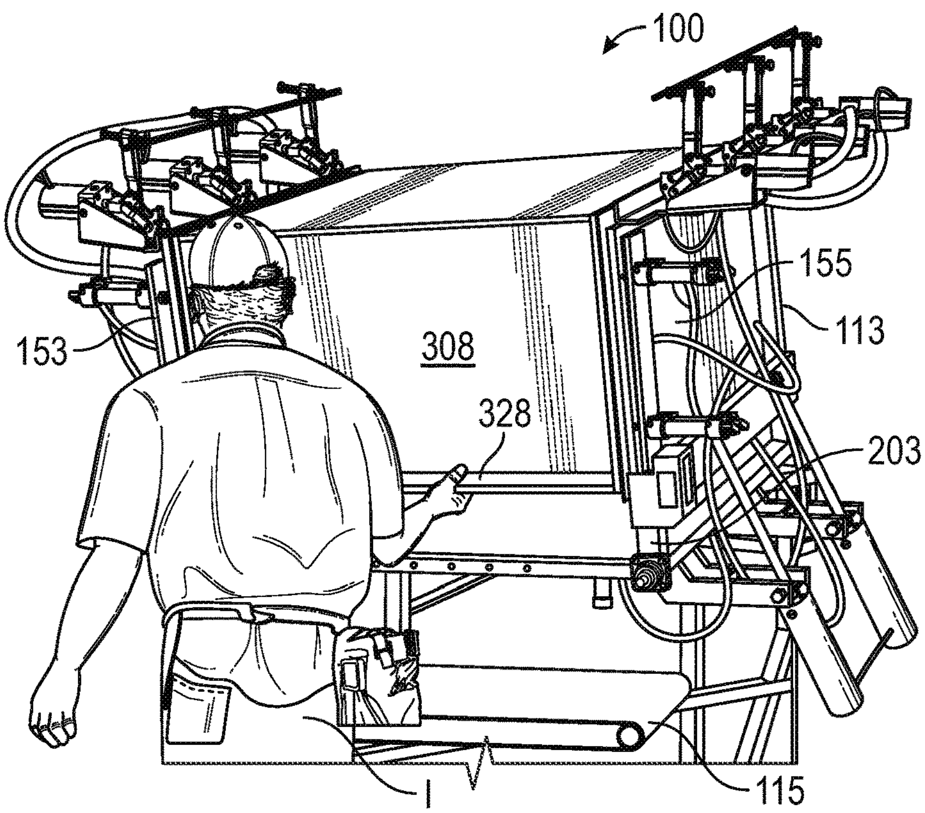
FIG. 9I illustrates an example of the worker positioning the toe kick panel on the toe kick supports.
Figure 9J:
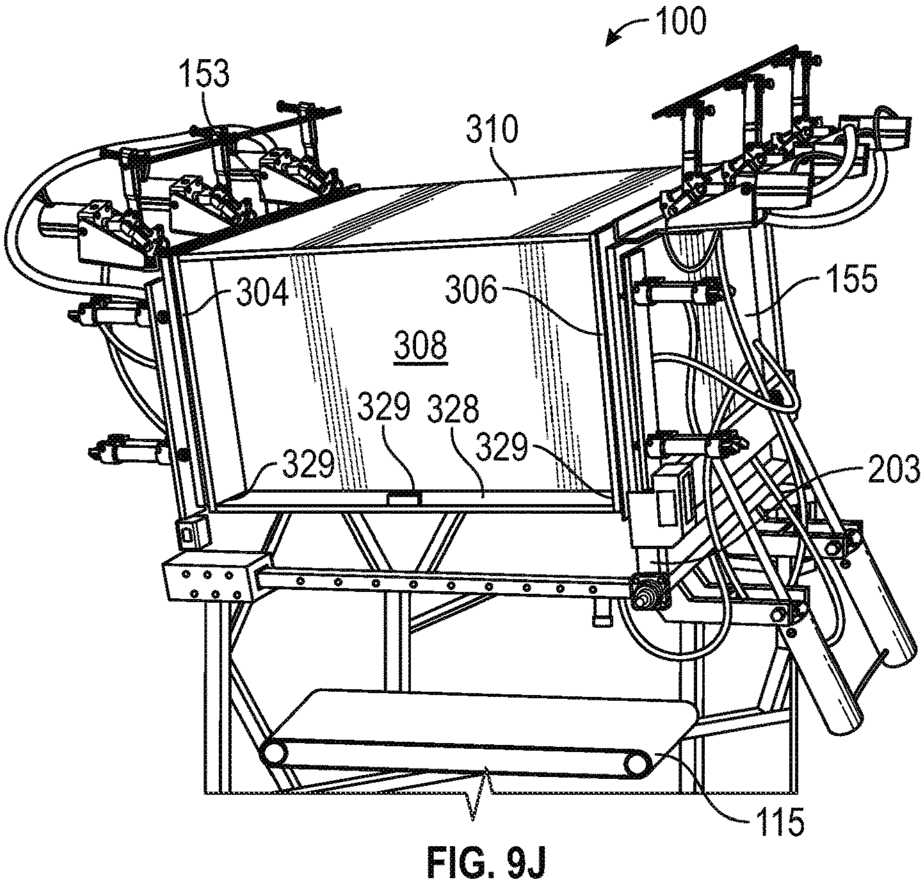
FIG. 9J illustrates an example of the toe kick panel attached to the bottom panel and the side panels.
Figure 9K:
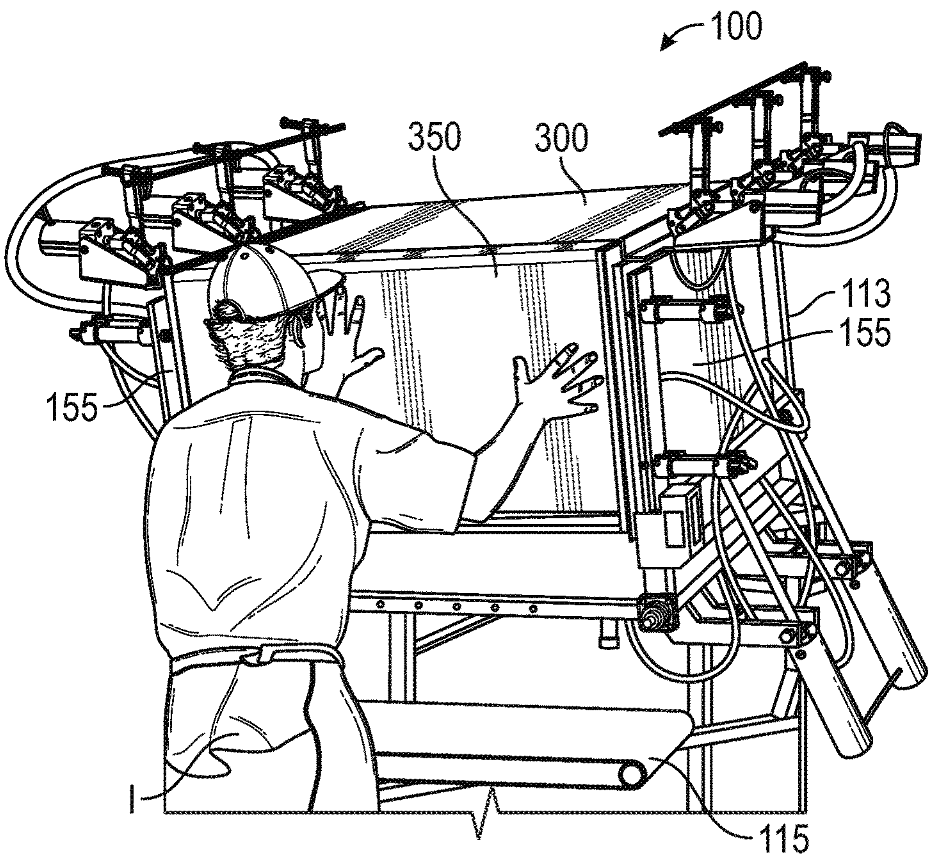
FIG. 9K illustrates an example of the worker positioning a protective carton on the bottom of the cabinet.
Figure 9L:
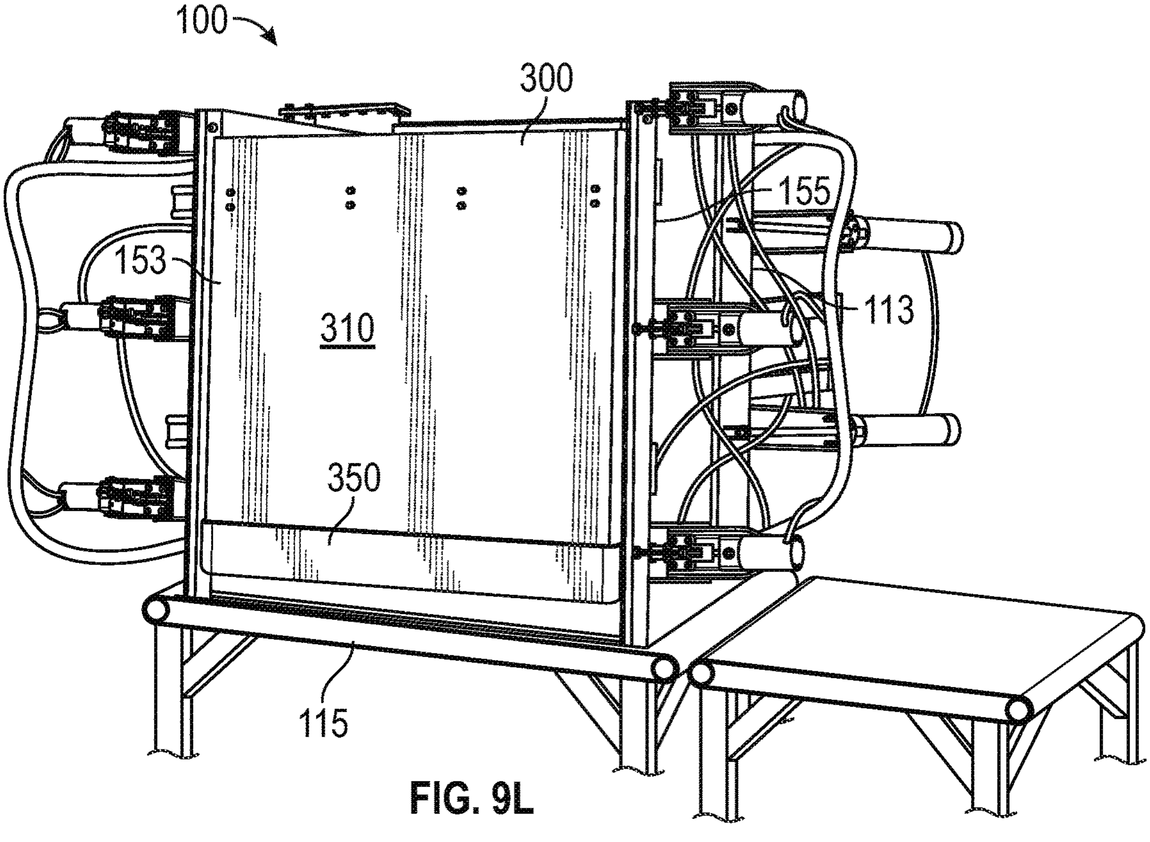
FIG. 9L illustrates an example of the cabinet assembly jig rotating the clamp assembly down to deposit the assembled cabinet on the conveyor assembly.
Figure 9M:
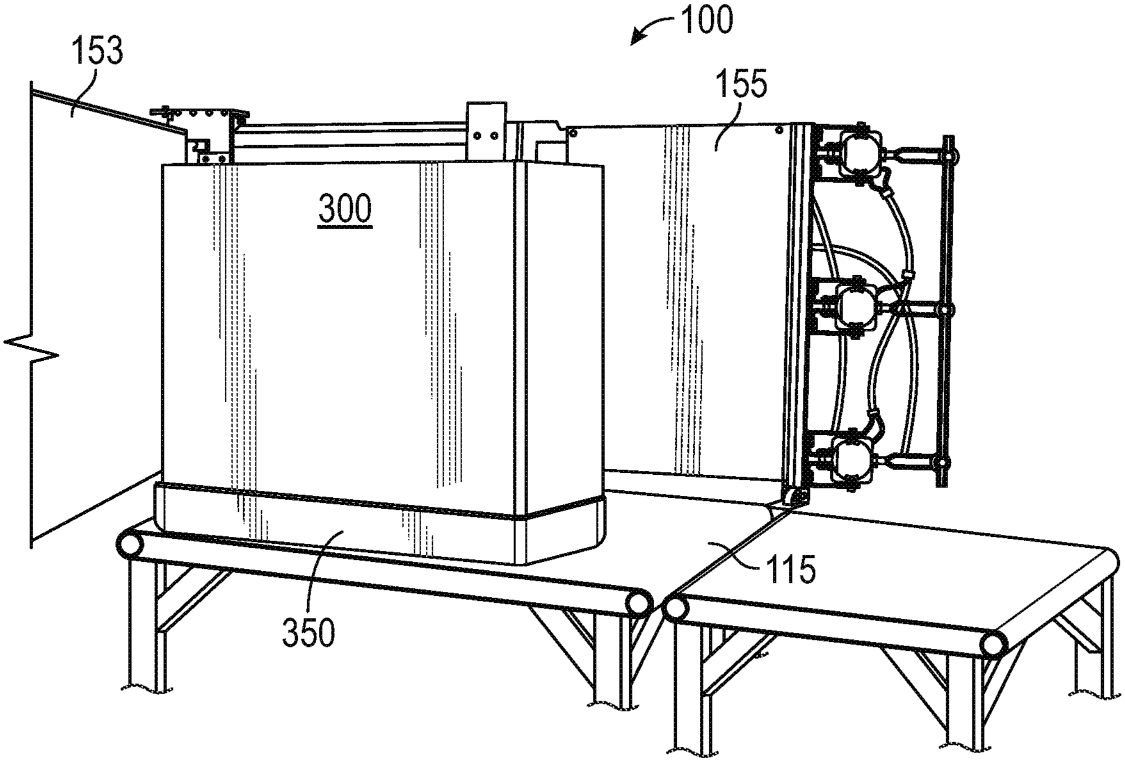
FIG. 9M illustrates an example of the cabinet assembly jig with the second jaw open and the assembled cabinet being moved away from the cabinet assembly jig by the conveyor assembly.

In the illustrated embodiment of the jig 100, the first jaw 153 and the second jaw 155 each include a carton clamp 195. The carton clamp 195 is positioned on the first jaw 153 and the second jaw 155 just above the rods 191. The carton clamp 195 of the second jaw 155 is shown in the detail view of FIG. 5. With reference to FIG. 5, the carton clamp 195 includes a carton clamp bar 197. In some embodiments, the carton clamp bar 197 comprises a flat strip. In some embodiments, the carton clamp bar 197 comprises a round or square bar. In some embodiments, the carton clamp bar 197 is omitted. In the illustrated embodiment, the carton clamp bar 197 is attached to rods 198 that extend through the frame 171 of the second jaw 155. The rods 198 are attached to actuators 199 that are operable to extend and retract the rods 198 and the carton clamp bar 197. In use, the carton clamp 195 is operable to secure a carton in place during a portion of the assembly process, as shown in FIGS. 9K-9M, discussed below. Although FIG. 5 shows an embodiment of the carton clamp 195 on the second jaw 155, the carton clamp 195 on the first jaw 153 can be similar. In some embodiments, the carton clamp 195 can be omitted.

With reference again to FIGS. 1A-1D, the first jaw 153 and the second jaw 155 each include a toe kick support assembly 201. In the illustrated embodiment, the two toe kick support assemblies 201 are positioned near the bottom proximal corner of each of the first jaw 153 and the second jaw 155. The toe kick support assemblies 201 are operable to support a side support plate kick panel during a portion of the assembly process (as shown, for example, in FIGS. 9G-9J described below). An embodiment of a toe kick support assembly 201 is shown in the detail view of FIG. 6.

Figure 6:
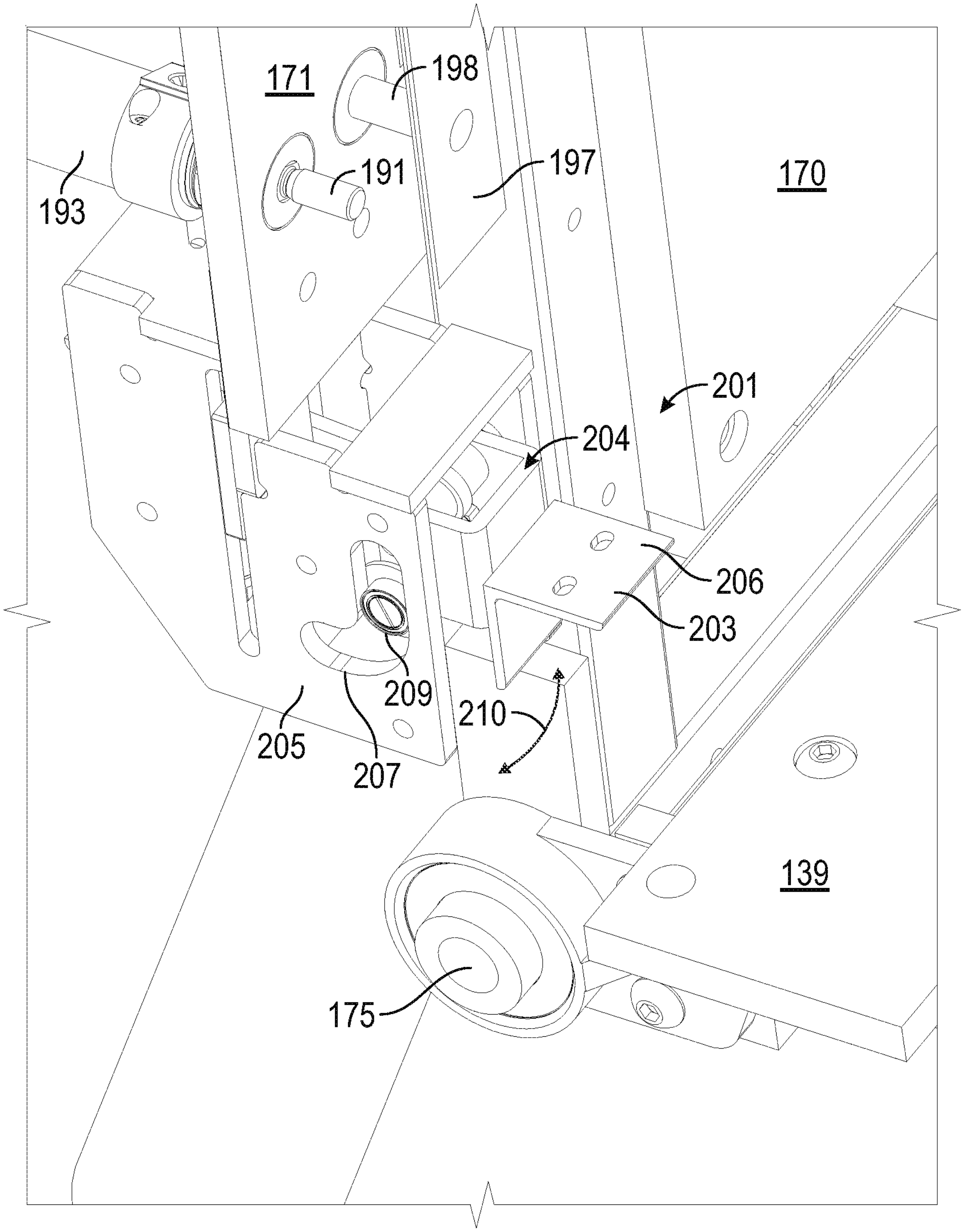
FIG. 6 is an isometric detail view of an embodiment of a side support plate kick support for the cabinet assembly jig in an extended configuration.

With reference to FIG. 6, the toe kick assembly 201 can include a toe kick support 203. The toe kick support 203 can include a flat face 206 for supporting the toe kick panel. In the illustrated embodiment, the toe kick support 203 is attached to a retraction mechanism 204. In the illustrated embodiment, the retraction mechanism 204 includes a pin, wheel, or bearing 209 positioned within a slot 207 of a bracket that is attached to the frame 171. An actuator (not shown) can be attached to the retraction mechanism 204. The actuator is operable to move the bearing 209 within the slot 207. As the bearing 209 moves with the slot 207, the toe kick support 203 moves back and forth in the direction of arrow 210, between an extended position (as shown in FIG. 6) and a retracted position (as shown, for example, in FIG. 9G).

As noted previously, FIGS. 1A-1D illustrate the jig 100 in the first configuration. In the first configuration, the second jaw 155 is pivoted to a closed position in which it is substantially parallel with the first jaw 155 (see, for example, the top view of FIG. 1C). Also, the clamp assembly 113 assembly is pivoted relative to the base 111 such that an angle $\alpha_1$ (as measured between the front support plates 139 and ground or base 111 or a plane defined by the ends of the feet 129) is formed. The angle $\alpha_1$ is illustrated in the right side view of FIG. 1D. In some embodiments, the angle $\alpha_1$ is between 30 and 80 degrees, between 35 and 75 degrees, between 40 and 70 degrees, between 40 and 65 degrees, between 40 and 60 degrees, between 40 and 55 degrees, between 45 and 55 degrees or approximately 50 degrees. In some embodiments, the angle $\alpha_1$ is at least 10 degrees, at least 20 degrees, at least 30 degrees, at least 40 degrees, at least 50 degrees, at least 60 degrees, at least 70 degrees or more. Other angles and ranges are also possible. Additionally, in the first configuration, the conveyor system 115 is in a retracted position. As best seen in the right side view of FIG. 1D, in some embodiments, the retracted position, the distal end of the conveyor system 115 is positioned approximately even with the front end of the base 111. In some embodiments, this allows a worker to easily access the clamp portion 113. For example, a worker can stand or reach between the first jaw 153 and the second jaw 155 to position the front panel of the cabinet against the front support plates 139. In the first configuration, the rods 141, 191 are in the extended position, and the toe kick support assembly 201 is in the retracted position. The use of the jig 100 in the first configuration will be described in detail below.

FIGS. 2A and 2B illustrate the jig 100 in the second configuration. FIG. 2A is an isometric view and FIG. 2B is a right side view of the jig 100. In the second configuration, the first jaw 153 and the second jaw 155 are parallel, as described above with reference to the first configuration. However, in the second configuration, the clamp assembly 113 is tilted back even further or more reclined (when compared to the first configuration). As shown in the right side view of FIG. 2B, the clamp assembly 113 is positioned at an angle $\alpha_2$ (again measured between the front support plates 139 and ground). As shown, the angle $\alpha_2$ is less than angle $\alpha_1$. In some embodiments, the angle $\alpha_2$ is between 50 and 10 degrees, between 50 and 15 degrees, between 45 and 20 degrees, between 45 and 25 degrees, between 40 and 25 degrees, between 40 and 30 degrees, between 35 and 30 degrees or approximately 30 degrees. In some embodiments, angle $\alpha_2$ is at least 10 degrees, at least 20 degrees, at least 30 degrees, at least 40 degrees, at least 50 degrees, at least 60 degrees, at least 70 degrees or more. In some embodiments, the angle $\alpha_2$ is 5 degrees less than the angle $\alpha_1$, the angle $\alpha_2$ is 10 degrees less than the angle $\alpha_1$, the angle $\alpha_2$ is 15 degrees less than the angle $\alpha_1$, the angle $\alpha_2$ is 20 degrees less than the angle $\alpha_1$, the angle $\alpha_2$ is 25 degrees less than the angle $\alpha_1$, the angle $\alpha_2$ is 30 degrees less than the angle $\alpha_1$, the angle $\alpha_2$ is 35 degrees less than the angle $\alpha_1$, the angle $\alpha_2$ is 45 degrees less than the angle $\alpha_1$, the angle $\alpha_2$ is 50 degrees less than the angle $\alpha_1$, the angle $\alpha_2$ is 55 degrees less than the angle $\alpha_1$, the angle $\alpha_2$ is 60 degrees less than the angle $\alpha_1$, the angle $\alpha_2$ is 65 degrees less than the angle $\alpha_1$, the angle $\alpha_2$ is 70 degrees less than the angle $\alpha_1$, the angle $\alpha_2$ is 75 degrees less than the angle $\alpha_1$, the angle $\alpha_2$ is 80 degrees less than the angle $\alpha_1$. Other angles and ranges are also possible. In some embodiments, the angle $\alpha_2$ is more reclined than the angle $\alpha_1$. That is, the angle $\alpha_2$ is less than the angle $\alpha_1$ In the second configuration, the rods 141, 149 are in the retracted position, and the toe kick support assembly 201 is in the extended position. The use of the jig 100 in the second configuration will be described in detail below.

FIGS. 3A-3C illustrate the jig 100 in the third configuration. FIG. 3A is an isometric view, FIG. 3B is a top view, and FIG. 3C is a right side view of the jig 100. In the third configuration, the second jaw 155 is pivoted to an open position. For example, as shown in the top view of FIG. 3B, the second jaw 155 is pivoted so that the side support plate 170 is substantially aligned or parallel with the front support plates 139. Stated another way, in the third configuration, the second jaw 155 is positioned at a 90-degree angle relative to the first jaw 153. As shown in the right side view of FIG. 3C, in the third configuration, the clamp assembly 113 is pivoted forward such that an angle $\alpha_3$ (as measured between the front support plates 139 and ground or base 111 or a plane defined by the ends of the feet 129) is approximately 90 degrees. In some embodiments, the angle $\alpha_3$ is between 95 degrees and 85 degrees. In some embodiments, the angle $\alpha_3$ is between 75 degrees and 105 degrees. In some embodiments, the angle $\alpha_3$ is between 60 degrees and 120 degrees. Also shown in FIG. 3C, in the third configuration, the conveyor system 115 is in an extended position. In the extend position, the conveyor system 115 has slid out (relative to the base 111) along the rails 125, such that it overhangs the front end of the base 111 by a distance C. In some embodiments, the distance C is approximately 10 inches, 12 inches, 14 inches, 16 inches, 18 inches, 20 inches, 22 inches, 24 inches or longer. In some embodiments, the distance C is between ¾ and ¼ the width of the first jaw 153 or the conveyor system 115, between ¾ and ½ the width of the first jaw 153 or the conveyor system 115, between ½ and ¼ the width of the first jaw 153 or the conveyor system 115, between ½ and ⅛ the width of the first jaw 153 or the conveyor system 115, or at least ⅛ the width of the first jaw 153 or the conveyor system 115, at least ¼ the width of the first jaw 153 or the conveyor system 115, at least ⅜ the width of the first jaw 153 or the conveyor system 115, at least ½ the width of the first jaw 153 or the conveyor system 115, at least ⅝ the width of the first jaw 153 or the conveyor system 115, at least ¾ the width of the first jaw 153 or the conveyor system 115, or longer. Other distances C, both longer and shorter than the listed values, as well as various ranges between the listed values, can also be used. In the third configuration, the rods 141, 191 and the toe kick support assembly 201 are in the retracted configuration. The use of the jig 100 in the third configuration will be described in detail below.

Figure 7:
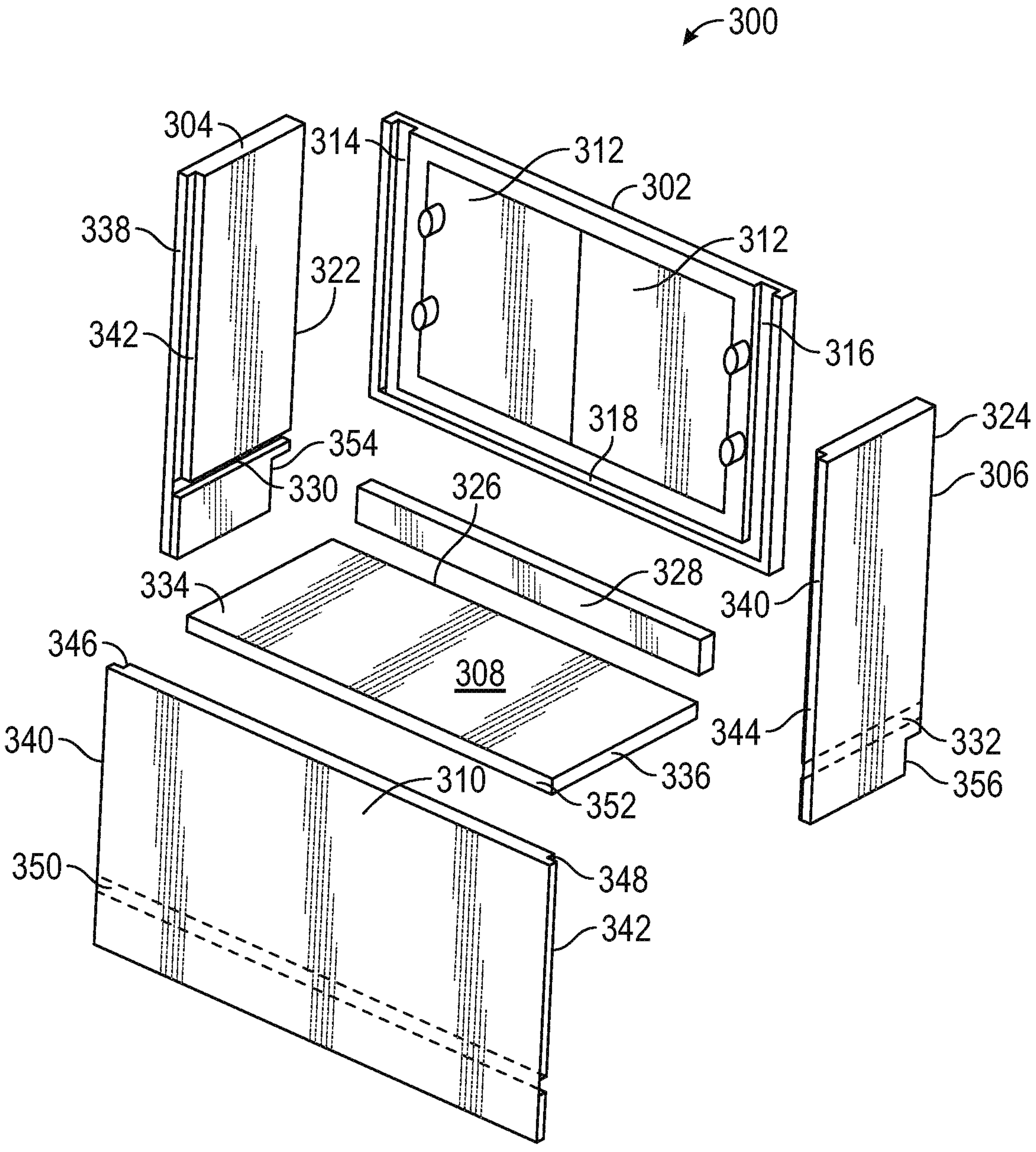
FIG. 7 is an exploded perspective view of an embodiment of a cabinet and illustrates an example front panel, two side panels, a bottom panel, and a back panel.

FIG. 7 is an exploded perspective view of an embodiment of a cabinet 300 and illustrates embodiments of a front panel 302, two side panels 304, 306, a bottom panel 308, a back panel 310, and a toe kick panel 328. The cabinet 300 can be assembled using in the jig 100. As noted previously, the jig 100 can also be used to assemble different types and configuration of cabinets, as well as other types of furniture.

In the illustrated embodiment, the front panel 302 includes side grooves 314, 316 and a bottom groove 318 formed into the back surface of the front panel 302. The side grooves 314, 316 can be configured to receive the front edges 322, 324 of the side panels 304, 306, respectively, when assembled. The bottom groove 318 can be configured to receive a front edge 326 of the bottom panel 308 when assembled. In some embodiments, the front panel 304 is preassembled with doors 312, openings for drawers, or other features. Each side panel 304, 306 also includes a groove 330, 332 on its inner face that is configured to receive the side edges 334, 336 of the bottom panel when assembled. Back edges 338, 340 of the side panels 304, 306 include grooves 342, 344 that are configured to mate with corresponding grooves 346, 348 on the side edges 340, 342 of the back panel 310. The inside surface of the back panel 310 also includes a groove 350 for receiving the back edge 352 of the bottom panel 308. Each of the side panels 304, 306 also include cutouts 354, 356 for receiving the toe kick panel 328.

In some embodiments, each of the front panel 302, two side panels 304, 306, bottom panel 308, back panel 310, and toe kick panel 328 are formed (i.e., manufactured, prepared, etc.) as described above before arriving at the jig 100 for assembly. In some embodiments, an adhesive, such as glue, may be pre-applied to the various grooves described above prior to assembly with the jig 100.

Figure 8A:
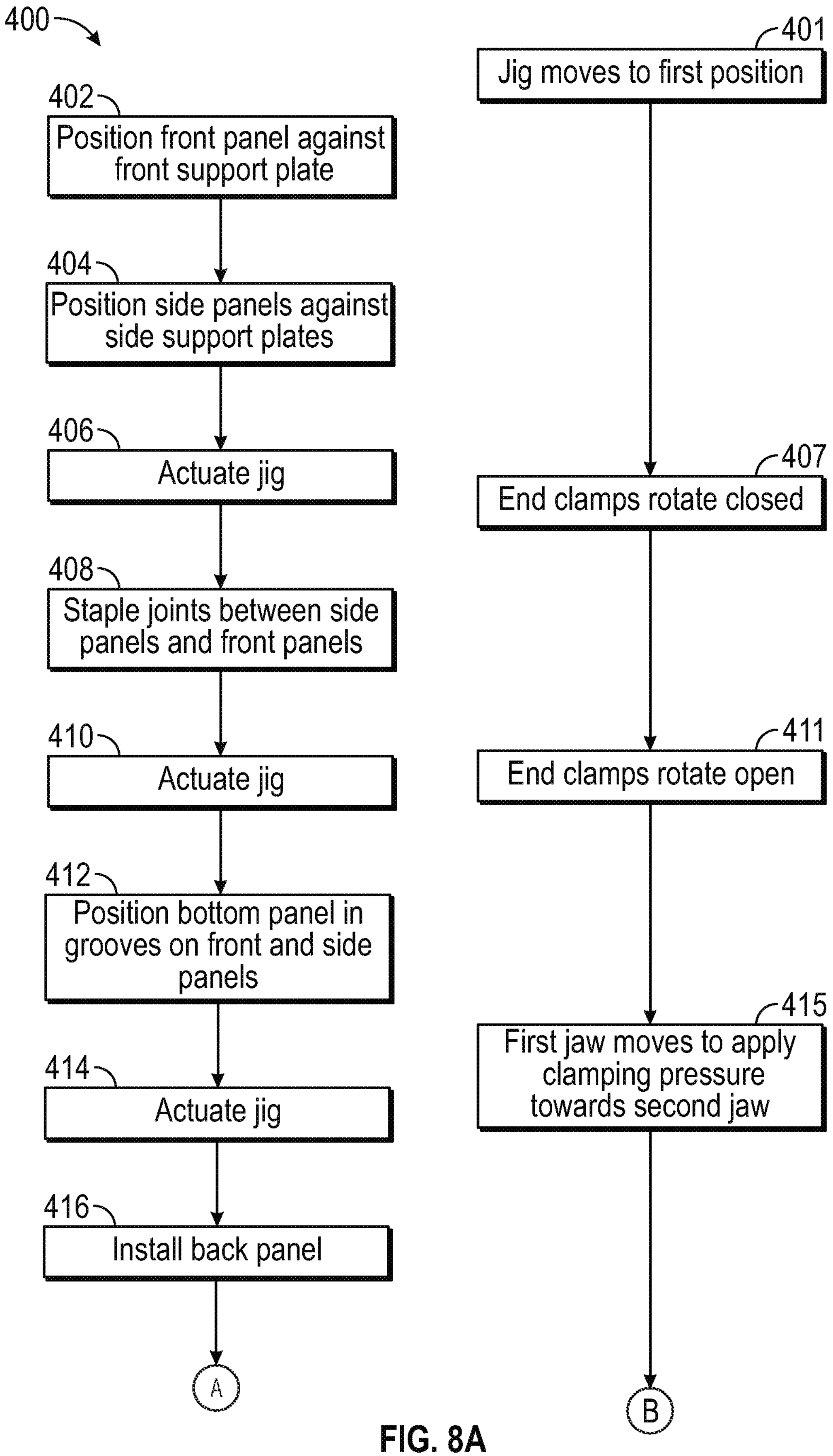
FIGS. 8A and 8B illustrate an example method for using the cabinet assembly jig to assemble a cabinet.
Figure 8B:
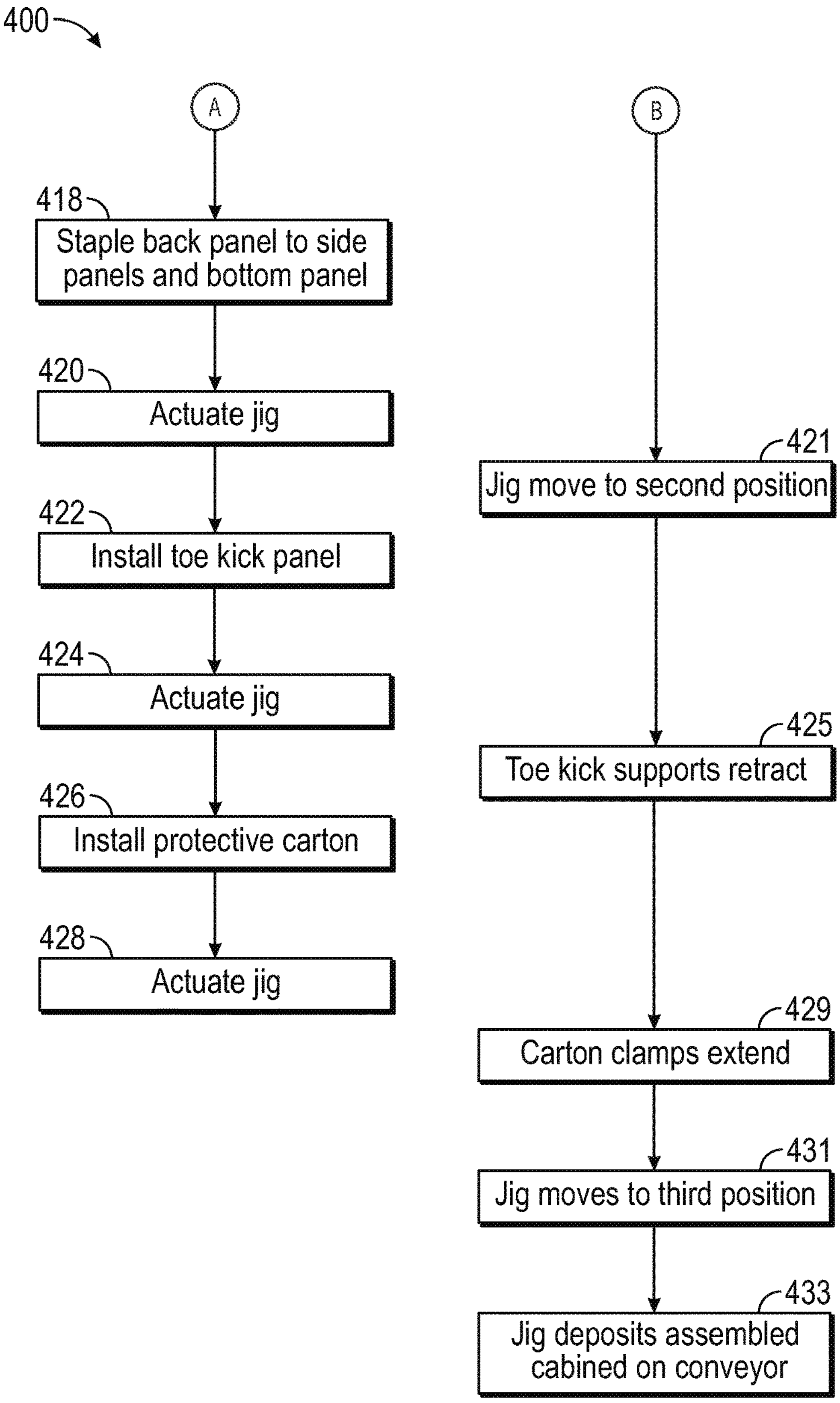

FIGS. 8A and 8B illustrate an example method 400 for using the jig 100 to assemble the cabinet 300. The method 400 includes steps performed by a worker and steps performed by the jig 100. The steps performed by the worker are illustrated on the left sides of FIGS. 8A and 8B, and the steps performed by the jig 100 are illustrated on the right sides of FIGS. 8A and 8B. Additionally, steps performed by the worker have even numbered reference numerals, while steps performed by the jig 100 have odd numbered reference numerals. Although described as a single method 400, the method 400 can also be considered as two separate methods: one performed by the worker and one performed by the jig 100. In some embodiments, the illustrated steps of the method 400 may be modified or omitted. Although steps of the method 400 are illustrated sequentially in FIGS. 8A and 8B, the order of the steps may be varied from that shown. The method 400 may also include additional steps that are not illustrated. The method 400 will now be described with reference to FIGS. 8A and 8B, as well as FIGS. 9A-9M, which illustrate a worker 1 and the jig 100 in various steps in the assembly process of the cabinet 300.

The method 400 begins at step 401, where the jig 100 moves to the first configuration (for example, the configuration as shown in FIGS. 1A-1D). Moving to the first configuration can include: closing the second jaw 155, pivoting the clamp assembly 113 to the angle $\alpha_1$, extending the rods 141, 191, retracting the toe kick support assembly 201, and/or retracting the conveyor system 115. In the first configuration, the jig 100 is ready for the worker 1 to begin assembling the cabinet 300.

At step 402, the worker 1 positions the front panel 302 of the cabinet 300 into the jig 100. For example, the worker 1 can position the front surfaces of the front panel 302 against the front support plates 139 of the jig 100. The bottom edge of the front panel 302 can be supported by the rods 141. An example of step 402 is shown in FIG. 9A. As illustrated in FIG. 9A, the worker 1 is able to step or stand between the first jaw 153 and the second jaw 155 to position the front panel 302 against the front support plates 139 because, with the jig 100 in the first configuration, the conveyor system 115 is in the retracted position. The first and second jaws 153, 155 are spaced apart sufficient to receive the front panel 302 therebetween.

Next, at step 404, the worker 1 positions the side panels 304, 306 into the jig 100. This can include positioning the first side panel 304 against the side support plate 157 of the first jaw 153 and positioning the second side panel 306 against the side support plate 170 of the second jaw 155. The front edges 322, 324 of the side panels 304, 306 are positioned within the side grooves 314, 316 on the inner surface of the front panel 302. The bottom edges of the side panels 304, 306 can be supported by the rods 191, which can be in the extended configuration. FIG. 9B illustrates an example of the step 404. In FIG. 9B, the first side panel 304 is already positioned in the jig 100 and the worker 1 is positioning the second side panel 306 in the jig 100.

After the side panels 304, 306 are positioned in the jig 100, the worker 1 then actuates the jig 100. In some embodiments, actuating the jig 100 includes pressing a button on a control panel (not shown). The control panel can be located near the jig 100. In some embodiments, the control panel includes two buttons that must be actuated at the same time using both hands to actuate the jig 100. This can help ensure that the worker 1 is clear of the jig 1 at the time the jig 100 is actuated.

When the worker 1 actuates the jig 100 at step 406, the jig 100 can rotate the end clamps 181 to the closed position at step 407. FIG. 9C illustrates the jig 100 with the end clamps 181 rotated to the closed position. As shown, in the closed position, the end clamps 181 apply a clamping force that presses the side panels 304, 306 into the front panel 302. With the end clamps 181 rotated to the closed position, the worker 1 can then staple (or uses another method of joining, e.g., screw, nail, etc.) the joints between the side panels 304, 306 and the front panel 302 at step 408. In some embodiments, the staples hold the side panels 304, 306 to the front panel 302 while the adhesive cures to form a strong bond. After stapling, the worker 1 again actuates the jig 100 at step 410. The worker 1 can actuate the jig 100 in the manner previously described (i.e., with the control panel).

When the worker 1 actuates the jig 100 at step 410, the end clamps 181 rotate back to the open position at step 411. Next, at step 412, the worker 1 installs the bottom panel 308. The bottom panel 308 can be inserted into the grooves 330, 332 on the inner surfaces of the side panels 304, 306 and into the bottom groove 318 on the inner surface of the front panel 302. FIG. 9D illustrates an example of the worker 1 inserting the bottom panel 308. With the bottom panel 308 installed, the worker 1 again actuates the jig 100 at step 414.

Upon actuation, the first jaw 153 can move towards the second jaw 155 to apply clamping pressure to the cabinet 300 at step 415. In some embodiments, moving the first jaw 153 includes operating the actuators 161 as described above. In this configuration, the jig 100 applies clamping pressure that presses the first and second sides 304, 306 tightly against the bottom panel 308. Next, at step 416, the worker 1 installs the back panel 310. An example of the worker 1 installing the back panel 310 is illustrated in FIG. 9E. As shown, the worker 1 positions the back panel 310 between the first and second jaws 153, 155. Grooves 340, 342 on the side edges of the back panel 310 mate with grooves 338, 340 on the back edges of the side panels 304, 306. The back edge of the bottom panel 308 is received within the groove 350 on the inner surface of the back panel 310. In some embodiments, the steps 414, 415 are performed after the step 416.

The method 400 continues in FIG. 8B. At step 418, the worker 1 staples staple (or uses another method of joining, e.g., screw, nail, etc.) the back panel 310 to the side panels 304, 306 and the bottom panel 308. FIG. 9F illustrates an example of the worker 1 performing the step 418. The dashed lines in FIG. 9F illustrate the location of the staples on the back panel 310. After stapling the back panel 310, the worker again actuates the jig 100 at step 420. Actuation of the jig 100 at step 420, can cause the jig 100, at step 421, to transition from the first configuration (as shown in FIGS. 1A-1D) to the second configuration (as shown in FIGS. 2A and 2B). In some embodiments, the second configuration is more reclined that the first configuration. That is, in some embodiments, the angle $\alpha_2$ (see FIG. 2B) in the second configuration is less than the angle $\alpha_1$ (see FIG. 1D) in the first configuration. In some embodiments, the second configuration is more reclined than the first configuration by at least 10 degrees, at least 20 degrees, at least 30 degrees at least 40 degrees, at least 50 degrees, at least 60 degrees or more or between 10 and 60 degrees, between 20 and 50 degrees, between 25 and 40 degrees, between 25 and 35 degrees, or 30 degrees. That is, the angle $\alpha_2$ can be less than the angle $\alpha_1$ by at least 10 degrees, at least 20 degrees, at least 30 degrees at least 40 degrees, at least 50 degrees, at least 60 degrees or more or between 10 and 60 degrees, between 20 and 50 degrees, between 25 and 40 degrees, between 25 and 35 degrees, or 30 degrees.

In some embodiments, transitioning from the first configuration to the second configuration can include: pivoting the clamp assembly 113 to the angle $\alpha_2$, retracting the rods 141, 191, and/or extending the toe kick support assembly 201. FIGS. 9G and 9H illustrate aspects of the transition. For example, as shown in FIG. 9G, the rods 141, 191 are in the extended position and the toe kick support 203 of the toe kick support assembly 201 is in the retracted position. In FIG. 9H, the rods 141, 191 have been retracted and the toe kick support 203 of the toe kick support assembly 201 has been extended. In some embodiments, transitioning from the first configuration to the second configuration can include raising the bottom of the clamp assembly 113 by a vertical distance of at least ¾ the total height of the clamp assembly, ½ the total height of the clamp assembly, ¼ the total height of the clamp assembly, ⅕ the total height of the clamp assembly, ⅛ the total height of the clamp assembly, or ⅒ the total height of the clamp assembly, or between ¾ and ⅒ the total height of the clamp assembly, ½ and ⅛ the total height of the clamp assembly, ½ and ¼ the total height of the clamp assembly, or ⅓ the total height of the clamp assembly.

With the jig 100 in the second configuration, the worker 1 can install the toe kick panel 328 at step 422. Installing the toe kick panel 328 can include positioning the toe kick panel 328 on the toe kick supports 203 as shown in FIG. 9I. The worker 1 can then staple the toe kick panel 328 to the side panels 304, 306 and the bottom panel 308 using brackets 329. FIG. 9J illustrates an example of the toe kick panel 328 to the side panels 304, 306 and the bottom panel 308 using brackets 329. The brackets 329 can include wedges that can be stapled to both the toe kick panel 328 and the side panels 304, 306 or bottom panel 308.

Next, at step 424 the worker 1 again actuates the jig 100 in the manner described above. Upon actuation, at step 454, the toe kick supports 203 retract. At step 426, the worker 1 then installs a protective carton 350 over the bottom of the cabinet 300. The protective carton 350 can comprise a cardboard box configured to fit over the bottom of the cabinet 300. FIG. 9K illustrates an example of the worker 1 installing the protective carton 350. With the protective carton 350 installed, the worker 1 actuates the jig 100 at step 428 in the manner described above. Upon actuation, the jig 100 extends the carton clamps 195 at step 429. The carton clamps 195 hold the protective carton 350 in place.

Next, at step 431, the jig 100 transitions to the third configuration (for example, the configuration as shown in FIGS. 3A-3C). Transitioning to the third configuration can include pivoting the clamp assembly 113 to the angle $\alpha_3$ and/or extending the conveyor system 115 to the extended position, among other things. An example of pivoting the clamp assembly 113 to the angle $\alpha_3$ and extending the conveyor system 115 is illustrated in FIG. 9L. Finally, at step 433, the jig 100 opens the second jaw 155 to deposit the assembled cabinet 300 onto the conveyor 115. An example of step 433 is illustrated in FIG. 9M. The conveyor system 115 can then be actuated to move the assembled cabinet 300 away from the jig 100.

The method 400 can then be repeated to assemble another cabinet 300.

FIG. 10 is a plan view an assembly cell 500 comprising two jigs 100*a*, 100*b* and a system of conveyors. The cell 500 provides an example arrangement of equipment that can allow a small number of workers to quickly and efficiently assembly cabinets using the jigs 100*a*, 100*b*. For example, in some embodiments, three workers work in the cell 500 to produce cabinets. Compared with previous methods of cabinet manufacture, the cell 500 allows for a reduced number of workers to produce a higher number of cabinets in a given period of time. Additionally, the floor space required for the cell 500 can be the same or reduced when compared to previous methods of cabinet manufacture. Thus, the cell 500, using jigs 100*a*, 100*b*, can increase the efficiency of cabinet manufacture. Although FIG. 10 illustrates a particular embodiment of a cell 500, other arrangements are possible. For example, the cell 500 can include other numbers of jigs 100, for example, one, two, three, four, five, six, or more jigs 100. The cell 500 can also include other arrangements of conveyors and/or other equipment.

In the illustrated embodiment, the cell 500 includes two jigs 100*a*, 100*b*. The jigs 100*a*, 100*b* can be similar to the jig 100 described above. Each jig 100*a*, 100*b*, includes a conveyor system 115*a*, 115*b*, a first jaw 153*a*, 153*b*, and a second jaw 155*a*, 155*b*, among other features. In operation a single worker operates each jig 100*a*, 100*b*.

In some embodiments, an additional worker can prepare the panels of the cabinets to be assembled. For example, the additional worker can apply an adhesive, such as glue, to the grooves or other joints of the panels. The additional worker can also stack the panels in the order in which they will be loaded into the jigs 100*a*, 100*b*. For example, the additional worker can prepare a stack of panels with the front panel on top, followed by the side panels, bottom panel, and back panel below. In some embodiments, the additional worker loads the stacks of panels onto a conveyor 512. In some embodiments, the conveyor 512 is a non-motorized roller conveyor. The additional worker can load the stacks of panels at a load point 514, which can be approximately in the middle of the conveyor 512, and then alternatingly push the stacks of panels towards opposite ends 516, 518 of the conveyor 512. That is, the additional worker can prepare a first stack of panels, load it onto the conveyor 512 at load point 514, and push it towards the first end 516, and then, prepare a second stack of panels, load it onto the conveyor at load point 514, and push it towards the second end 518.

As shown in FIG. 10, the first end 516 can be located near the first jig 100*a*, a preparation stand 520, and a tool stand 522. In some embodiments, the worker operating the first jig 100*a* can receive the stack of panels from the first end 516 of the conveyor 512 and move them to the preparation stand 520. The tool stand 522 can hold various tools that are used by the worker in the assembly of the cabinet, including, for example, one or more staplers or other tools. The worker can then assemble the cabinet from the panels using the jig 100*a* in the manner previously described. Once assembled, the jig 100*a* deposits the cabinet onto the conveyor system 115*a* and opens the second jaw 155*a*. The jig 100*a* can be configured to drive the conveyor system 115*a* to move the assembled cabinet onto an adjacent conveyor 524.

In some embodiments, the conveyor 524 is driven by a motor 526. In some embodiments, the motor 526 is connected to the jig 100*a*, such that the motor 526 drives the conveyor 524 simultaneously with the operation of the conveyor system 115*a*. A sensor 528 can be positioned at the end of the conveyor 524. In some embodiments, the sensor 528 is a proximity sensor. The sensor 528 can include, for example an infrared beam. Use of other types of sensors is possible. The sensor 528 can provide a signal that indicates when the assembled cabinet reaches the end of the conveyor 524. The signal can be used to start or stop conveyor 524 or another conveyor, such as an adjacent conveyor 530.

The conveyor 530 can be driven by a motor 534. A sensor 532 can be positioned at a first end of the conveyor 530 and a sensor 536 can be positioned at a second end of the conveyor 530. The sensors 532, 536 can be of the type previously described. The sensors 532, 536 provide a signal that indicates when an assembled cabinet passes the sensors 532, 536. The signals from the sensors 532, 536 can be used to stop and/or start the conveyor 530, or any other conveyor. The conveyor 530 move the assembled cabinet onto a glide plate 538.

In some embodiments, the glide plate 538 includes a surface with a low coefficient of friction that allows the assemble cabinets to slide thereon. A sensor 540 is positioned to provide a signal that indicates that an assembled cabinet has been loaded onto the glide plate 538. The sensor 540 can be of the type previously described. In some embodiments, the sensor 540 provides a signal that activates a push arm 542. The push arm 542 can push an assembled cabinet that is on the glide plate 538 in the direction of arrow 544. The push arm 542 can push the assembled cabinet onto another conveyor 546.

In some embodiments, the conveyor 546 is a motorized conveyor. The conveyor 546 can include sensors 548, 550 at each end. The sensors 548, 550 can provide signals that control the operation of the motor of the conveyor 546. The sensors 548, 550 can be of the type previously described. In some embodiments, the conveyor 546 is a non-motorized conveyor, such as a roller conveyor. In the illustrated embodiment, a final conveyor 552 is positioned at the end of the conveyor 556. The conveyor 556 can be motorized or non-motorized.

Returning to the conveyor 512, the second end 518 can be located near the second jig 100*b*, a preparation stand 554, and a tool stand 556. In some embodiments, the worker operating the second jig 100*b* can receive the stack of panels from the second end 518 of the conveyor 512 and move them to the preparation stand 554. The tool stand 556 can hold various tools that are used by the worker in the assembly of the cabinet, including, for example, one or more staplers or other tools. The worker can then assemble the cabinet from the panels using the jig 100*b* in the manner previously described. Once assembled, the jig 100*b* deposits the cabinet onto the conveyor system 115*b* and opens the second jaw 155*b*. The jig 100*b* can be configured to drive the conveyor system 115*b* to move the assembled cabinet onto an adjacent conveyor 558.

In some embodiments, the conveyor 558 is driven by a motor 560. In some embodiments, the motor 560 is connected to the jig 100*b*, such that the motor 560 drives the conveyor 558 simultaneously with the operation of the conveyor system 115*b*. A sensor 562 can be positioned at the end of the conveyor 558. The sensor 562 can be of the type previously described. The sensor 562 can provide a signal that indicates when the assembled cabinet reaches the end of the conveyor 558. The signal can be used to start or stop conveyor 558 or another conveyor, such as an adjacent conveyor 564.

The conveyor 564 can be driven by a motor 568. A sensor 566 can be positioned at a first end of the conveyor 564 and a sensor 570 can be positioned at a second end of the conveyor 564. The sensors 566, 570 can be of the type previously described. The sensors 566, 570 provide a signal that indicates when an assembled cabinet passes the sensors 566, 570. The signals from the sensors 566, 570 can be used to stop and/or start the conveyor 564, or any other conveyor. The conveyor 564 move the assembled cabinet onto the glide plate 538.

A sensor 576 is positioned to provide a signal that indicates that an assembled cabinet has been loaded onto the glide plate 538 from the conveyor 564. The sensor 576 can be of the type previously described. In some embodiments, the sensor 576 provides a signal that activates the push arm 542. The push arm 542 can push the assembled cabinet onto another conveyor 546. As before, the assembled cabinet can then move on conveyors 546, 552.

In some embodiments, the sensor 536 and/or sensor 540 and the sensor 570 and/or sensor 572 can be used to index the cabinets coming from the first jig 100*a* and the second jig 100*b*. The sensors can index the cabinets so that the conveyors alternatingly load cabinets from each jig 100*a*, 100*b* on the glide plate 538.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication.

Any ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount. Features of embodiments disclosed herein preceded by a term such as "approximately," "about," and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A jig for assembling a furniture unit, the jig comprising:

a base comprising a plurality of interconnected supports, wherein one or more portions of said base are configured to rest atop a surface, the one or more portions defining a plane;

a clamp assembly comprising:

a frame connected to said base via a joint, said frame comprising a plurality of interconnected supports;

at least one front support plate connected to said frame, said at least one front support plate configured to provide a support surface for a first portion of said furniture unit during assembly;

a first jaw comprising a first side support plate configured to provide a support surface for a second portion of said furniture unit during assembly;

a second jaw comprising a second side support plate configured to provide a support surface for a third portion of said furniture unit during assembly;

one or more actuators connected to said base and said clamp assembly, said one or more actuators configured to cause the clamp assembly to move relative to the base about said joint; and a conveyer system movably mounted relative to said base via one or more rails, said conveyor system configured to be moved along said one or more rails from a retracted position to an extended position, said conveyer system extending beyond an end of said base a greater distance when in said extended position than when in said retracted position;

said jig configured to be transitioned from a first configuration to a second configuration and further configured to be transitioned from said second configuration to a third configuration, wherein:

when said jig is in said first configuration, said at least one front support plate of said clamp assembly is oriented at a first angle relative to said plane and said conveyer system is in said retracted position;

when said jig is in said second configuration, said at least one front support plate of said clamp assembly is oriented at a second angle relative to said plane and said conveyer system is in said retracted position;

said second angle is less than said first angle;

when said jig is in said third configuration, said at least one front support plate of said clamp assembly is oriented substantially perpendicular relative to said plane and said conveyer system is in said extended position;

wherein the at least one front support plate and the first and second side support plates of the clamp assembly move about a joint axis extending through said joint when said jig is transitioned to the second and third configurations.

2. The jig of claim 1, wherein said base comprises a plurality of feet, and wherein, said one or more portions of said base comprises ends of said plurality of feet.

3. The jig of claim 1, wherein, when said jig is in said first configuration, said first and second side support plates face toward one another, and wherein, said first and second jaws are configured to be moved toward and away from one another.

4. The jig of claim 3, wherein:

said at least one front support plate comprises a first front support plate and a second front support plate;

said first jaw is connected to said frame via said first front support plate;

said first front support plate is movably mounted to the frame; and a distance between said first and second side support plates is adjustable via movement of said first front support plate relative to the frame.

5. The jig of claim 4, further comprising:

at least one rail connected to the frame; and at least one carriage movably mounted to said at least one rail, wherein said first front support plate is connected to said at least one rail via said at least one carriage.

6. The jig of claim 4, wherein said first side support plate is movably mounted to said first front support plate such that said distance is adjustable via movement of said first side support plate relative to said first front support plate.

7. The jig of claim 6, further comprising:

at least one rail connected to said first front support plate; and at least one carriage movably connected to said at least one rail, wherein said first side support plate is connected to said at least one rail via said at least one carriage.

8. A jig for assembling a furniture unit, the jig comprising:

a base, wherein one or more portions of said base is configured to rest atop a surface, said one or more portions defining a plane;

a clamp assembly comprising:

a frame;

at least one front support plate connected to said frame, said at least one front support plate configured to provide a support surface for a first portion of said furniture unit during assembly;

a first jaw comprising a first side support plate configured to provide a support surface for a second portion of said furniture unit during assembly;

a second jaw comprising a second side support plate configured to provide a support surface for a third portion of said furniture unit during assembly; and one or more actuators connected to said base and said clamp assembly, said one or more actuators configured to cause the clamp assembly to move relative to the base about a joint;

a conveyer system movably mounted relative to said base, said conveyor system configured to be moved from a retracted position to an extended position;

said jig configured to be transitioned from a first configuration to a second configuration and further configured to be transitioned from said second configuration to a third configuration, wherein:

when said jig is in said first configuration, said at least one front support plate of said clamp assembly is oriented at a first angle relative to said plane and said conveyer system is in said retracted position;

when said jig is in said second configuration, said at least one front support plate of said clamp assembly is oriented at a second angle relative to said plane and said conveyer system is in said retracted position;

when said jig is in said third configuration, said at least one front support plate of said clamp assembly is oriented at a third angle relative to said plane and said conveyer system is in said extended position; and said first, second, and third angles are different from one another;

wherein the at least one front support plate and the first and second side support plates of the clamp assembly move about a joint axis extending through said joint when said jig is transitioned to the second and third configurations.

9. The jig of claim 8, wherein said base comprises a plurality of feet, and wherein, said one or more portions of said base comprises ends of said plurality of feet.

10. The jig of claim 8, wherein said third angle is greater than both of said first and second angles.

11. The jig of claim 8, wherein said second angle is less than said first angle.

12. The jig of claim 8, wherein, when said jig is in said third configuration, said at least one front support plate of said clamp assembly is oriented substantially perpendicular relative to said plane.

13. The jig of claim 8, wherein, when said jig is in said first configuration, said first and second side support plates face toward one another, and wherein, said first and second jaws are configured to be moved toward and away from one another.

14. The jig of claim 13, wherein:

said at least one front support plate comprises a first front support plate and a second front support plate;

said first jaw is connected to said frame via said first front support plate;

said first front support plate is movably mounted to the frame; and a distance between said first and second side support plates is adjustable via movement of said first front support plate relative to the frame.

* * * * *